INVENTOR.
EUGENE E. CRILE
PAUL M. THOMAS
BY WILLIAM R. THOMAS

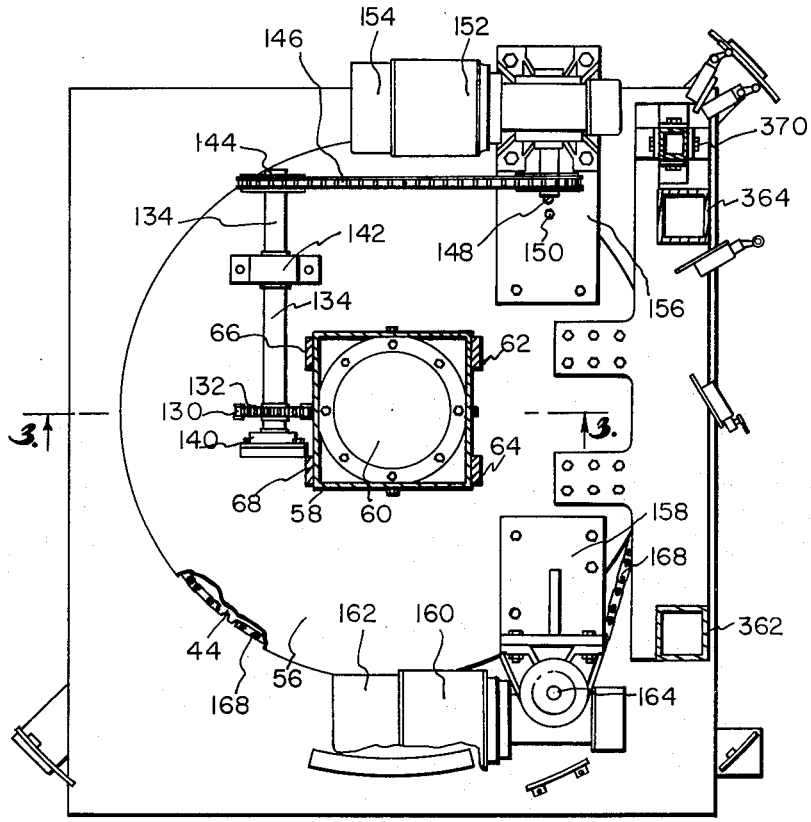
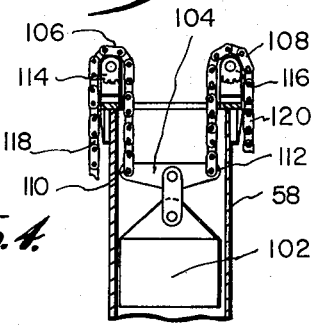
Fig. 2.
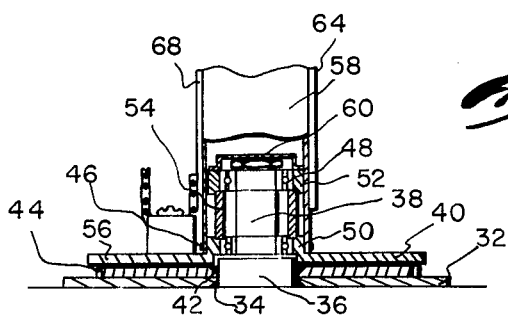
Fig. 3.
INVENTOR.
EUGENE E. CRILE
PAUL M. THOMAS
BY WILLIAM R. THOMAS

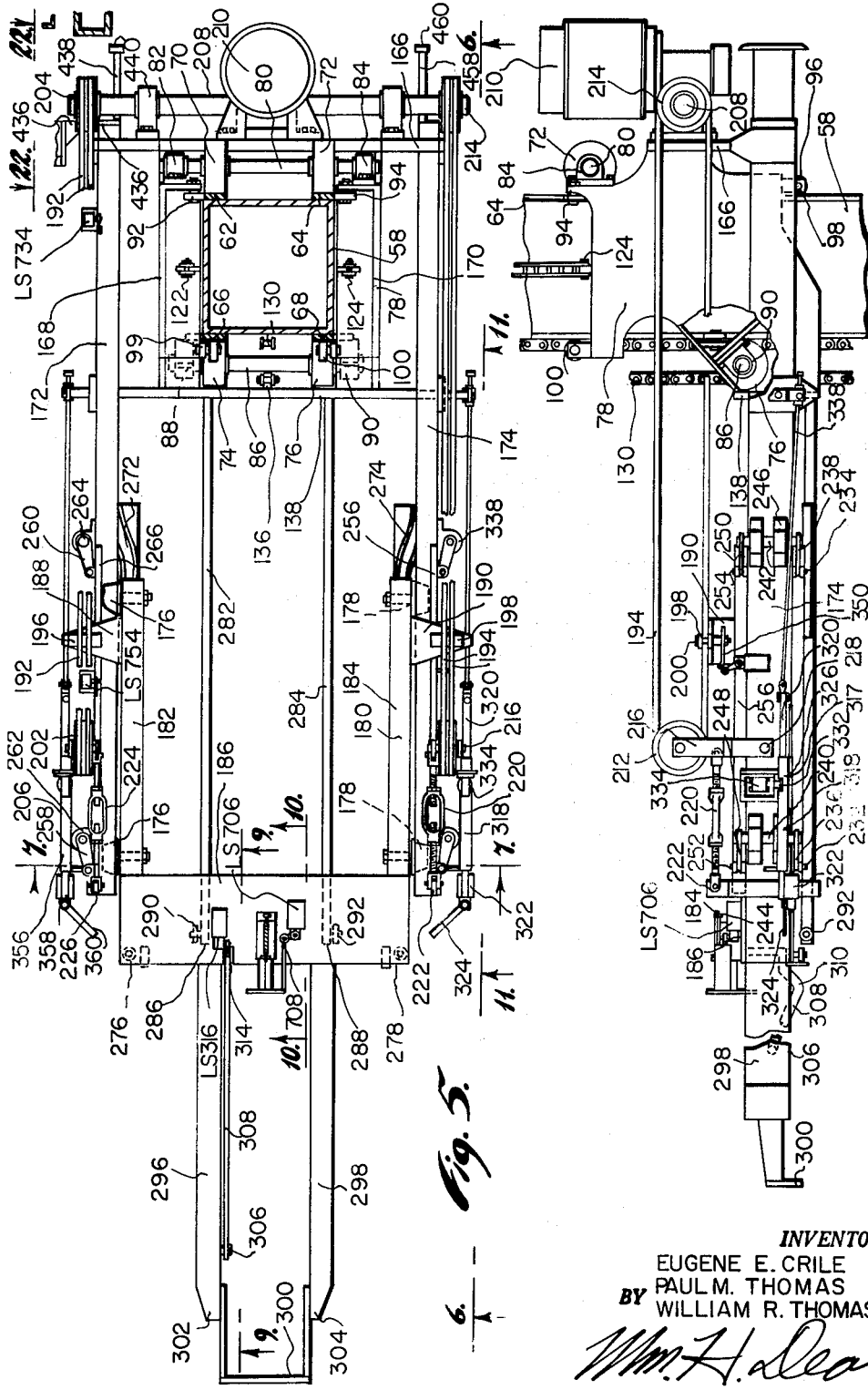

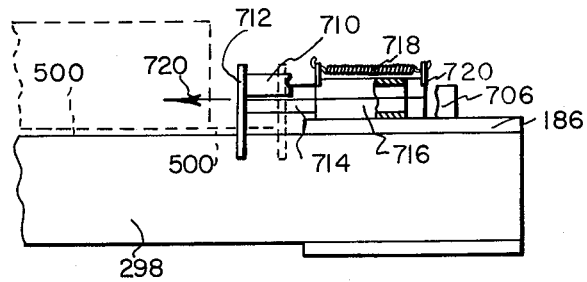
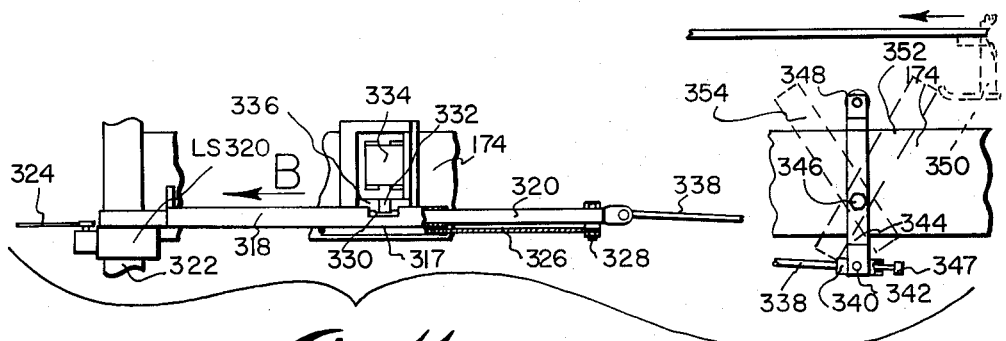
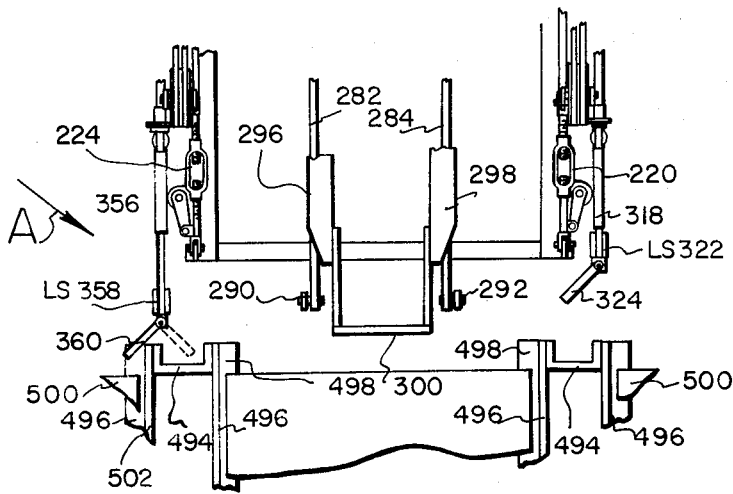

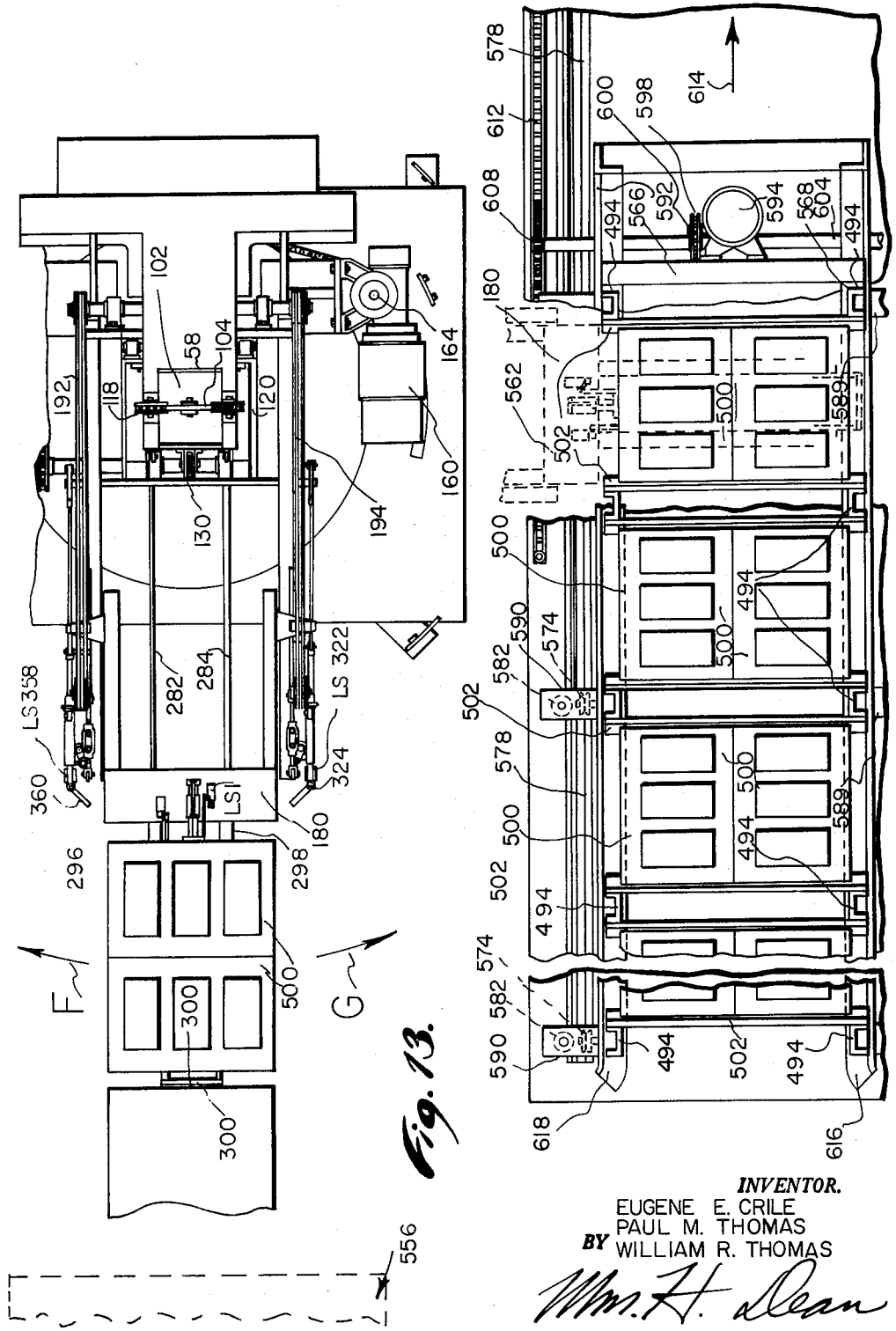

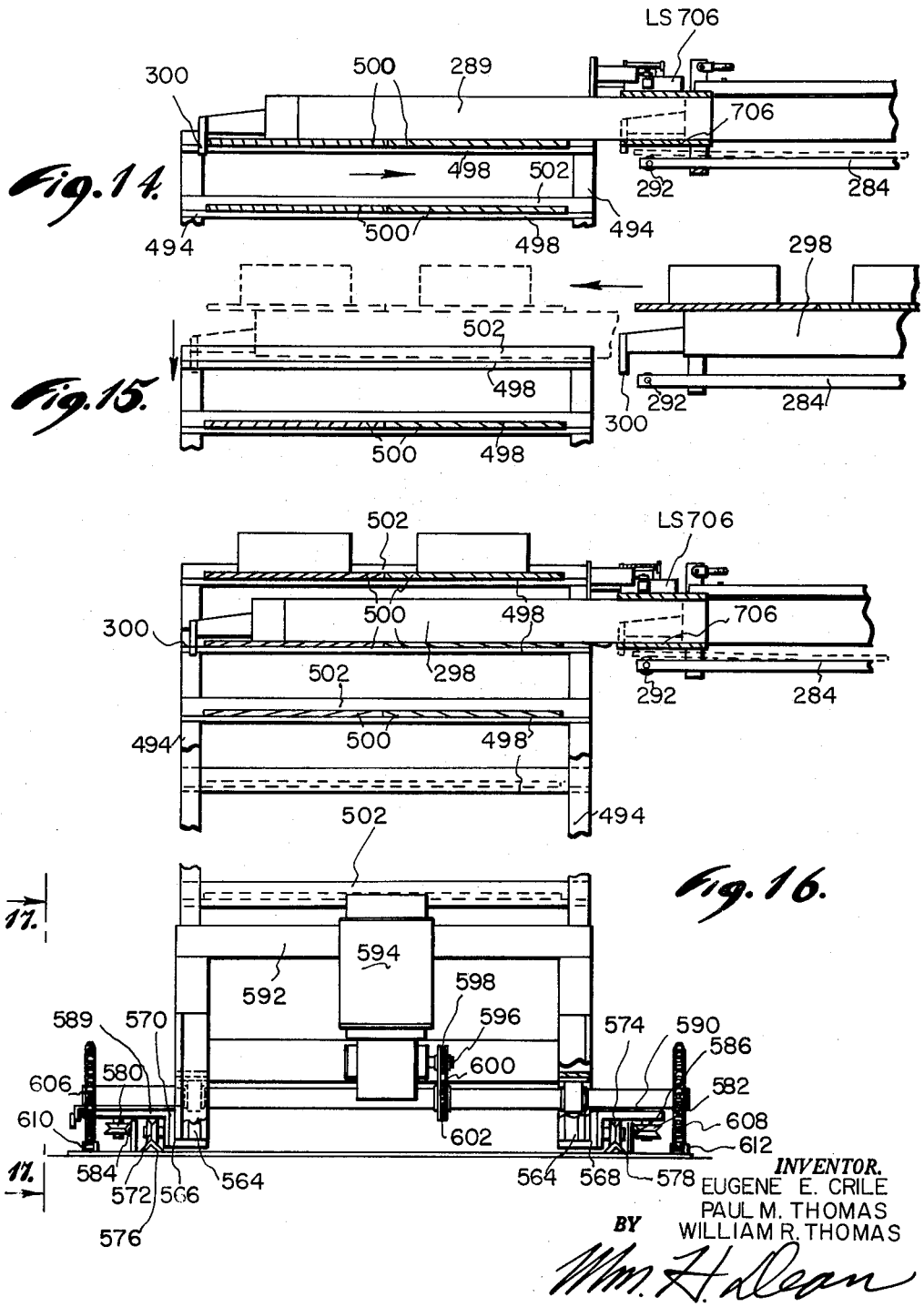

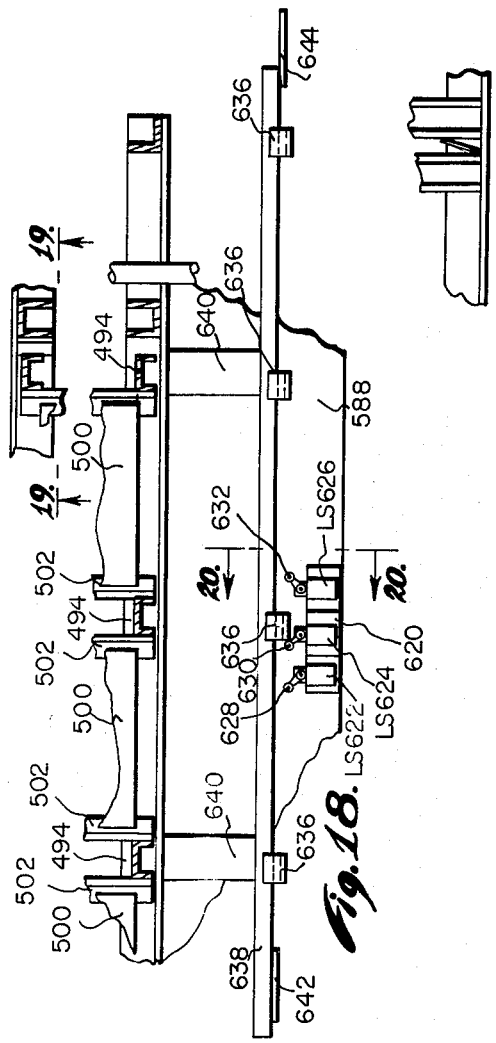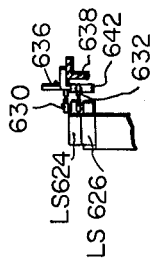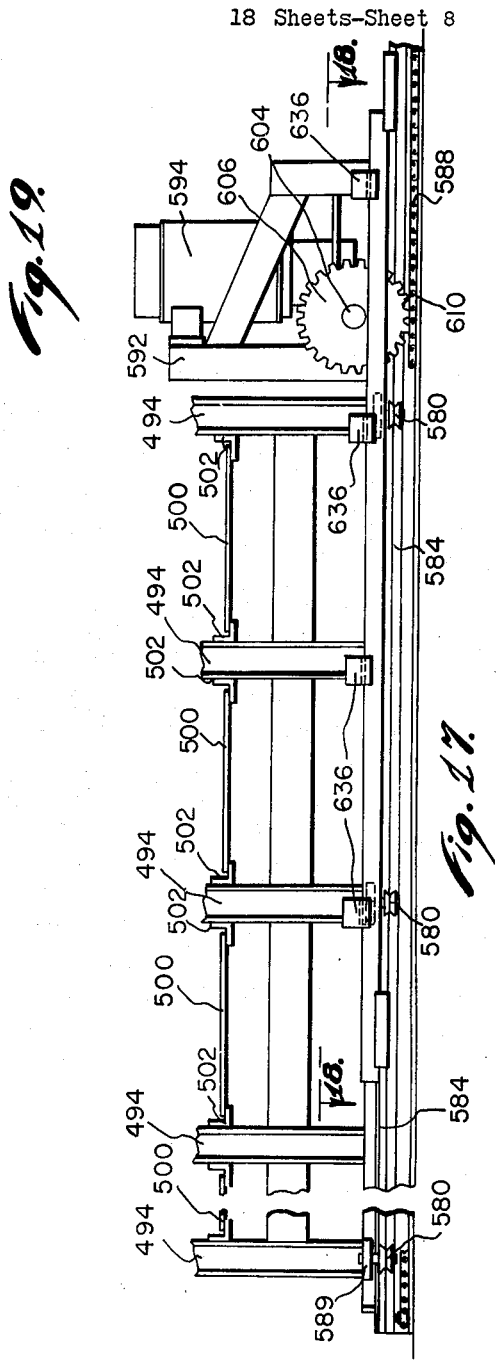

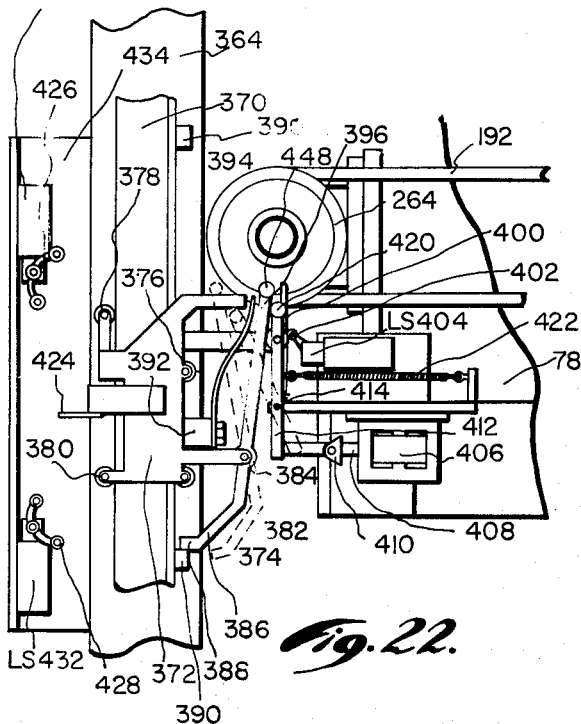

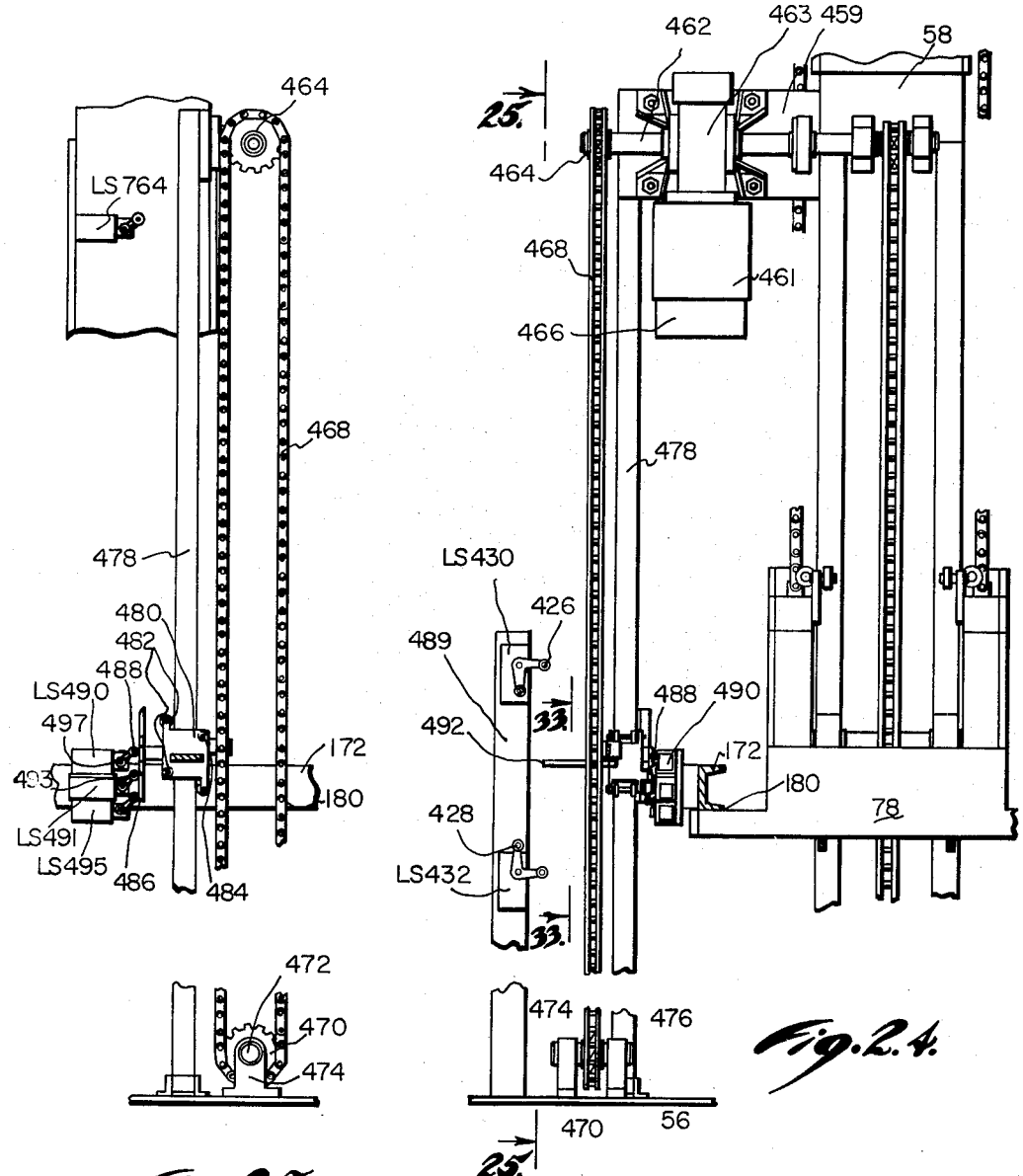

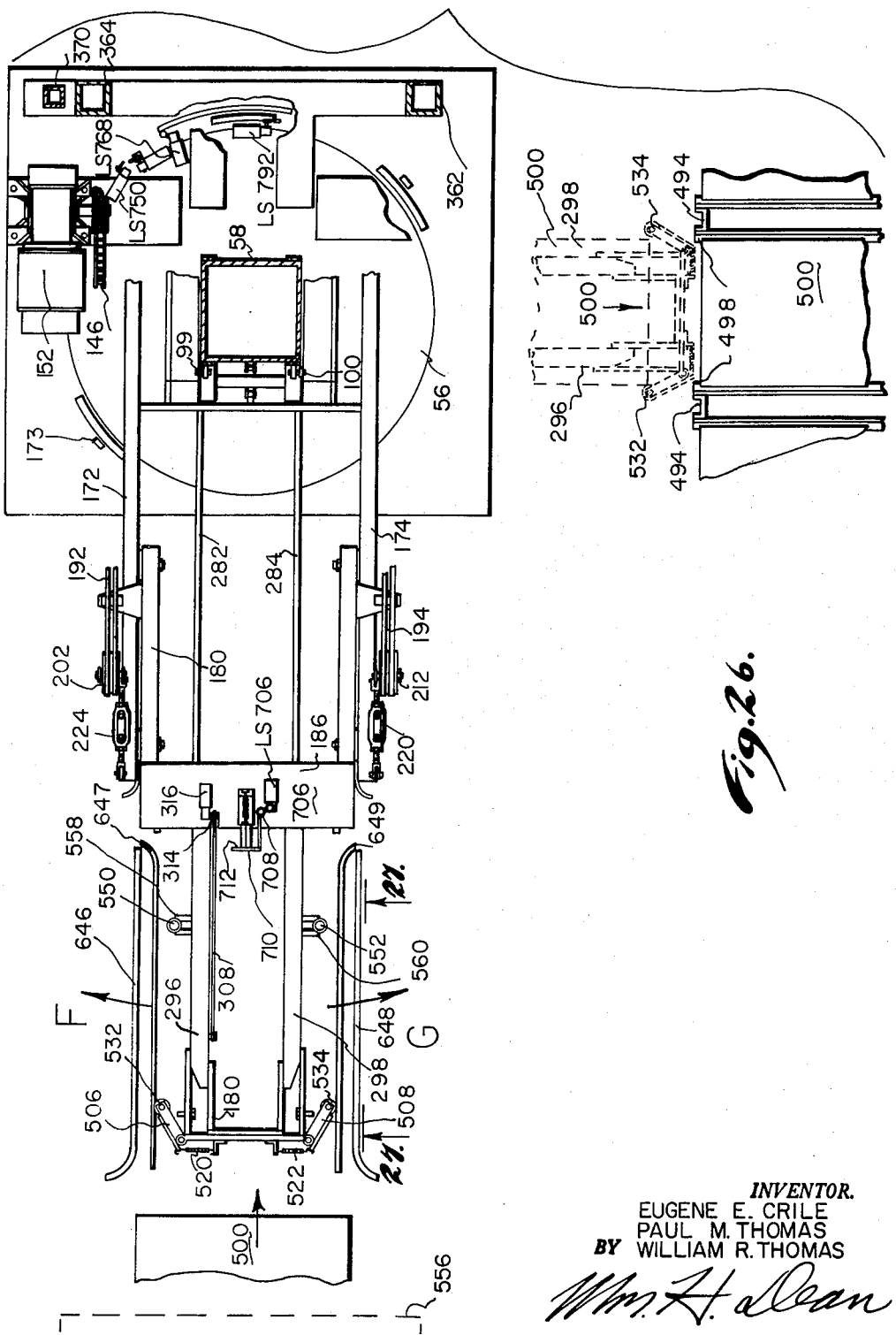

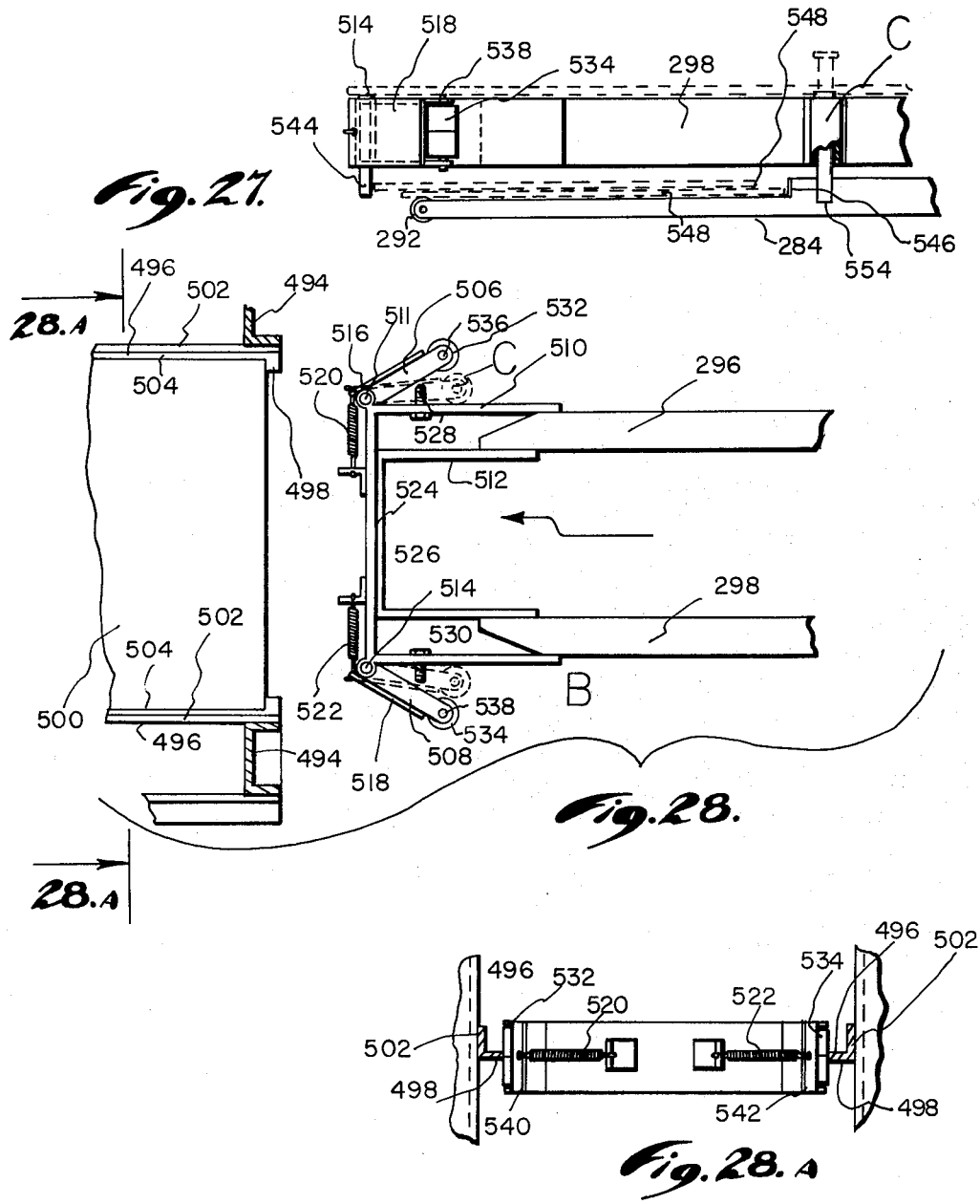

INVENTOR.
EUGENE E. CRILE
PAUL M. THOMAS
BY WILLIAM R. THOMAS

INVENTOR.
EUGENE E. CRILE
PAUL M. THOMAS
BY WILLIAM R. THOMAS

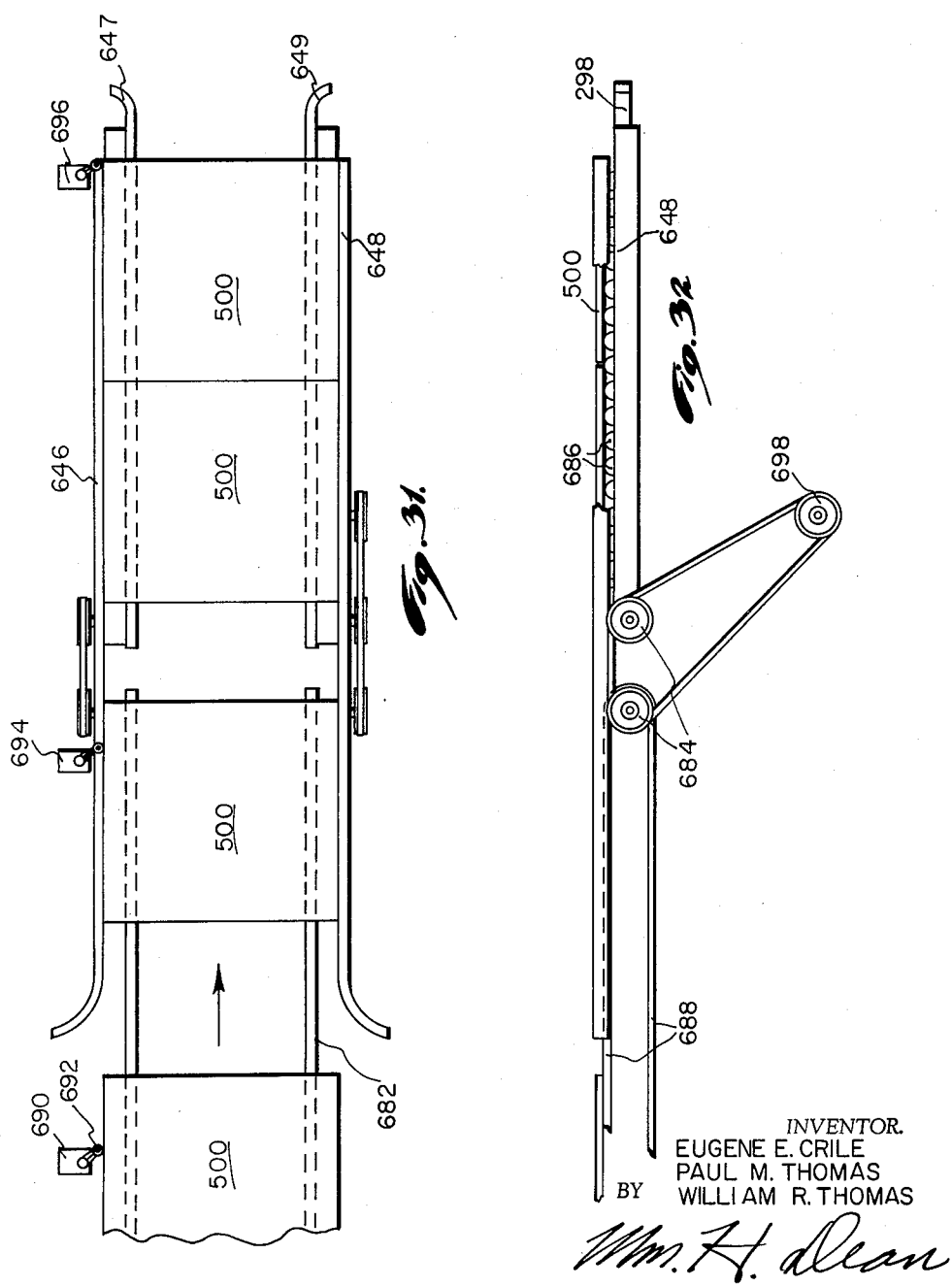

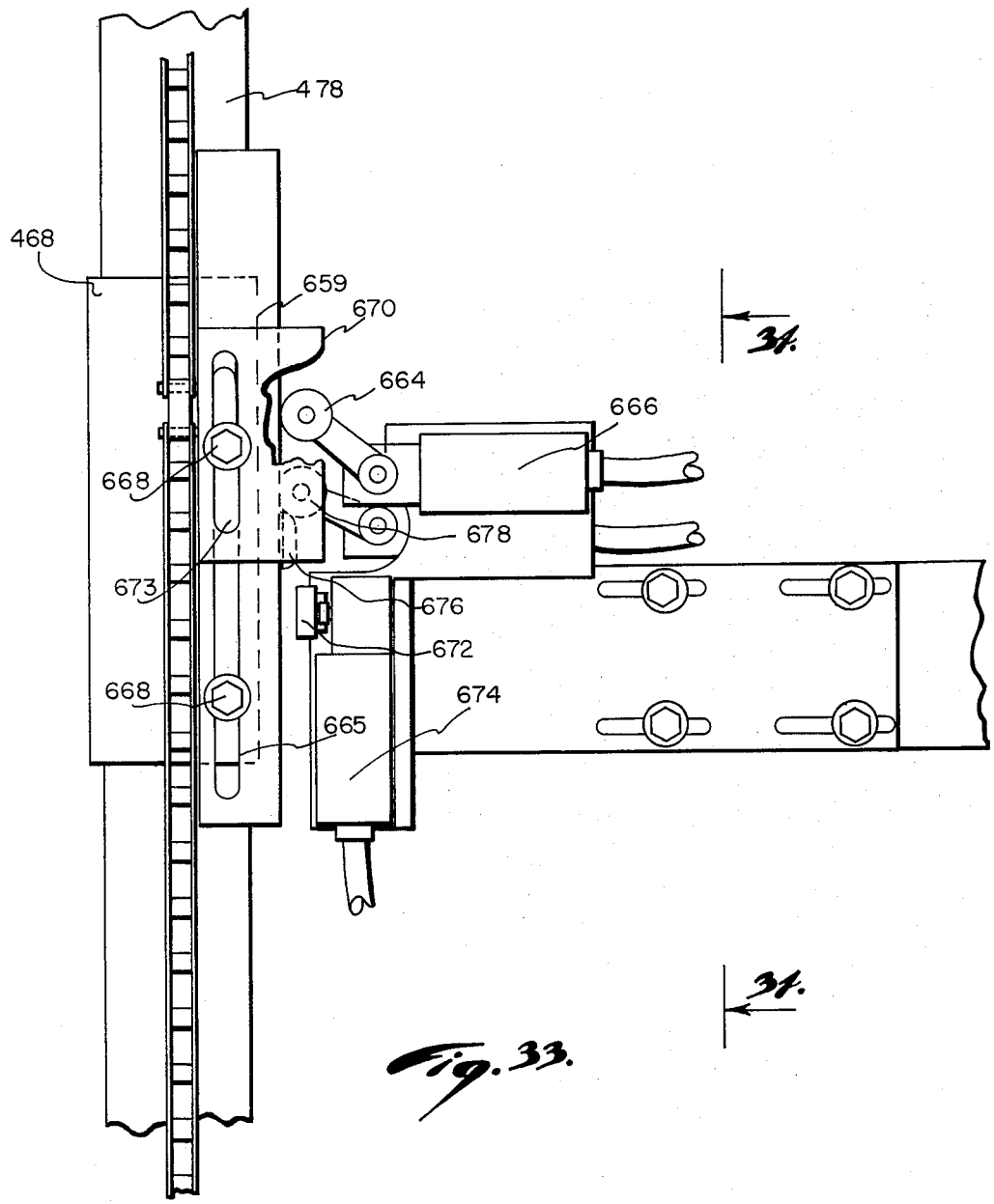

INVENTOR.
EUGENE E. CRILE
PAUL M. THOMAS
BY WILLIAM R. THOMAS

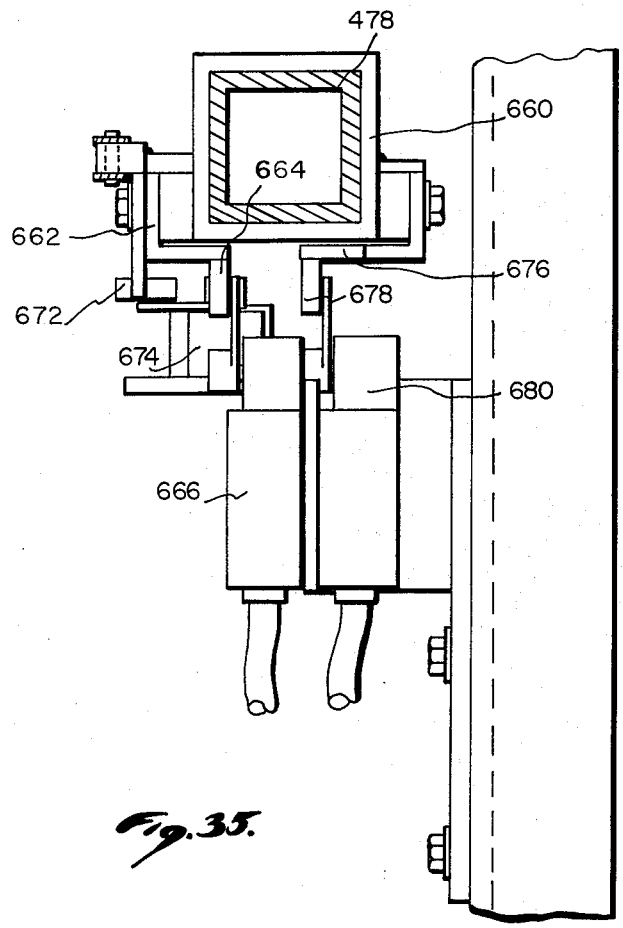

United States Patent Office 3,233,754
Patented Feb. 8, 1966

3,233,754
PALLET HANDLING MACHINE
Eugene E. Crile, 1619 W. Marlette; Paul M. Thomas, 5603 E. Edgewood Road; and William R. Thomas, 1109 W. Vista, all of Phoenix, Ariz.
Filed Aug. 21, 1962, Ser. No. 218,410
10 Claims. (Cl. 214—16.4)

This invention relates to a pallet handling machine and more particularly to a pallet handling machine adapted to receive laden pallets from a concrete block producing machine and to transfer such laden pallets to vertically spaced superimposed locations in pallet supporting racks adjacent to the concrete block producing machine.

The pallet handling machine of the present invention embodies improvements over a machine disclosed in an application of Eugene E. Crile et al., for Pallet Handling Machine, Serial No. 28,929, filed May 13, 1960, now abandoned.

In the production of concrete blocks, conventional block producing machines eject laden pallets which support one or more concrete blocks thereon. These pallets are always ejected from the block producing machine at a particular level and conventional pallet racks into which the pallets are loaded, generally comprise a plurality of vertically spaced superimposed shelves, some of which are above and some of which are below the delivery level of the concrete block producing machine.

The relationship of the delivery level of the machine and the superimposed spaced shelves above and below the delivery level has created many difficult problems in the operation of automatic pallet handling machines which will accurately and properly fill all of the shelves of the racks with laden pallets.

It will be understood by those skilled in the art that such a pallet handling machine must always return to the concrete block producing machine at precisely its delivery level and then must move up or down properly to index with a respective unladen shelf of a rack adjacent to the block producing machine.

The high production rate of modern concrete block producing machines imposes problems in the handling of laden pallets delivered by such a machine. Consequently, the rates at which pallet handling machine must operate are quite great when numerous movements horizontally and vertically are required properly to deliver laden pallets from the block producing machine to the racks and empty pallets from the racks to such a machine.

In addition to the high rates of operation required of a pallet handling machine, in accordance with the production rates of a concrete block producing machine, various precise locating operations must be carried out by the pallet handling machine in order to locate positions laterally with respect to the pallet racks when positioning laden pallets therein. Such operations of laterally locating the laden pallets in position to be inserted in the racks must be accomplished quickly and precisely in order to prevent tipping of the racks or damage of the concrete blocks on the pallets.

Accordingly, it is an object of the present invention to provide a pallet handling machine which pivots on a vertical axis and comprises means for elevating and horizontally moving its pallet carriage whereby pallet racks may be located on opposite sides of the pallet handling machine while the delivery axis of the concrete block producing machine may be located between the racks thereby permitting the pallet handling machine to swing from side to side toward either of the racks from the delivery axis of the concrete block producing machine.

Another object of the invention is to provide a pallet handling machine which comprises novel means for locating a pallet carriage thereof laterally with respect to a pallet rack so that laden pallets may accurately and quickly be positioned in the shelves of the rack.

Another object of the present invention is to provide a pallet handling machine which comprises novel means for locating the pallet carriage thereof laterally with respect to a pallet rack; said novel means comprising converging mechanism on an outwardly extending end of a pallet carriage which may be projected between shelf members of pallet supporting shelves; said carriage projectable horizontally from a machine structure pivotal on a substantially vertical axis and having a motor drive mechanism provided with braking means automatically disposed to stop the swinging movement of said carriage horizontally, whereby said carriage is moved into approximate alignment with a bay of rack shelves whereupon the brake mechanism of the motorized means is released when said carriage is approximately aligned with bays of rack shelves so that said converging means is free to seek its way between shelf members in the rack and thereby swing said carriage laterally into precise alignment between the shelf members of the rack and to thereby positively locate such rack shelves for longitudinal entrance of the carriage thereabove.

Another object of the invention is to provide a novel converging means having spring-loaded relatively converging pivoted members disposed on an outboard end of a pallet carriage whereby the carriage may be projected between horizontally spaced members in a pallet shelf rack and whereby the converging pivoted members automatically align the carriage with shelves of the rack as the carriage is projected longitudinally between horizontally spaced members of the rack.

Another object of the invention is to provide a pallet handling machine wherein means for locating the pallet carriage thereof laterally relative to a stationary pallet rack comprises mechanism for actuating and projecting an engaging member relative to the pallet carriage; and means on the engaging member which engages an element on the pallet rack for laterally indexing the pallet carriage relative to the shelves of the pallet rack.

Another object of the invention is to provide a pallet handling machine having electrical circuit means and motorized mechanism for advancing bays of pallet racks with respect to the pallet handling machine when the pallet handling machine moves downwardly beyond the lowermost shelf in a bay of the rack whereby the rack is subsequently moved by the motorized means so that the next adjacent bay of the rack shelves may be automatically positioned to receive laden pallets from the pallet handling machine of the invention.

Another object of the invention is to provide a pallet handling machine wherein a pallet carriage thereof is swingable from a concrete block producing machine alternately to either of a pair of spaced racks whereby the racks may be successively loaded without any difference in timing of the pallet handling machine in moving from the concrete block producing machine to either of the spaced pallet racks.

Another object of the invention is to provide a pallet handling machine wherein means is provided for locating laden pallets laterally with respect to a pallet rack which means comprises mechanism for precisely locating a laden pallet laterally of the pallet carriage and also means engagable with the pallet rack for laterally locating the pallet carriage with respect to the pallet rack whereby a laden pallet may be horizontally moved from the carriage precisely into the rack without tipping the same or damaging blocks on the laden pallet.

Another object of the invention is to provide a shelf height locating mechanism which precisely locates the vertical disposition of a pallet carriage of the machine above or below the delivery level of a concrete block producing machine so that laden pallets may accurately be placed at a proper vertical level with respect to the existing pallet rack shelves regardless of their mechanical condition or even though some shelves may be missing.

Another object of the invention is to provide a shelf height locating mechanism of approved character wherein means is precisely driven vertically with respect to movement of a pallet carriage and with respect to empty pallets located thereby as they are removed from rack shelves, whereby the positively driven shelf height locating means automatically and positively actuates an electrical switch means precisely with respect to the elevation of an empty pallet being removed from a rack shelf so that the machine may subsequently return to such position and deposit a laden pallet on the shelf from which the empty pallet was previously removed.

Another object of the invention is to provide a machine which is generally improved over that disclosed in said hereinbefore mentioned patent application.

Another object of the invention is to provide a variety of improvements in shelf height locating mechanisms for pallet handling machines.

Another object of the invention is to provide improvements in the frame and frame motorizing mechanisms of pallet handling machines.

Another object of the invention is to provide a pallet handling machine having all of its operating mechanism swingable on a fixed vertical axis and which also comprises mechanism for moving a pallet carriage vertically and horizontally whereby such combined movements may be accomplished simultaneously in order to accommodate a high production rate of a concrete block producing machine and accurately to place laden pallets in pallet racks and to deliver unladen pallets back to the producing machine.

Another object of the invention is to provide a pallet handling machine having a novel combination of mechanical and electrical devices for alternately loading spaced racks adjacent to a concrete block producing machine whereby one rack may be loaded while the other rack may be replaced by an empty one.

Another object of the invention is to provide a pallet handling machine which is very simple and economical of construction in proportion to its utility and complexity of operation and which machine is very durable and relatively easy to maintain.

Other objects and advantages of the invention may be apparent from the following specification, appended claims, and accompanying drawings, in which:

FIG. 1 of the drawings is a side elevational view of a pallet handling machine, in accordance with the present invention;

FIG. 2 is an enlarged plan sectional view taken from the line 2—2 of FIG. 1 showing portions broken away to amplify the illustration;

FIG. 3 is a reduced fragmentary sectional view taken from the line 3—3 of FIG. 2;

FIG. 4 is a fragmentary sectional view taken from the line 4—4 of FIG. 1;

FIG. 5 is a plan sectional view taken from the line 5—5 of FIG. 1;

FIG. 6 is a side elevational view taken from the line 6—6 of FIG. 5, showing portions broken away to amplify the illustration;

FIG. 10 is an enlarged elevational view taken from the line 10—10 of FIG. 5, showing portions broken away and in section to amplify the illustration;

FIG. 11 is an enlarged fragmentary elevational view taken from the line 11—11 of FIG. 5;

FIG. 12 is a fragmentary top or plan view of features of the pallet carriage of the invention including means disposed to locate the carriage as it swings horizontally with respect to structure of a pallet rack and shelves therein;

FIG. 13 is a fragmentary top or plan view of the pallet handling machine of the invention shown in relation to a block producing machine, pallet rack truck, and pallet rack thereon and illustrating, by broken lines, a varying position of the pallet handling carriage of said machine and in a position to deposit a loaded pallet in relation to shelves of the pallet rack;

FIG. 14 is a fragmentary vertical sectional view of a pallet rack having shelves with pallets thereon and a pallet handling carriage of the present invention in position to retract empty pallets from the uppermost shelf of a bay of the pallet rack;

FIG. 15 is a view similar to FIG. 14 but showing an operation subsequent to that shown in FIG. 14, wherein the pallet handling carriage of the invention places a plurality of laden pallets in position on a rack shelf from which empty pallets were previously removed;

Figure 1:
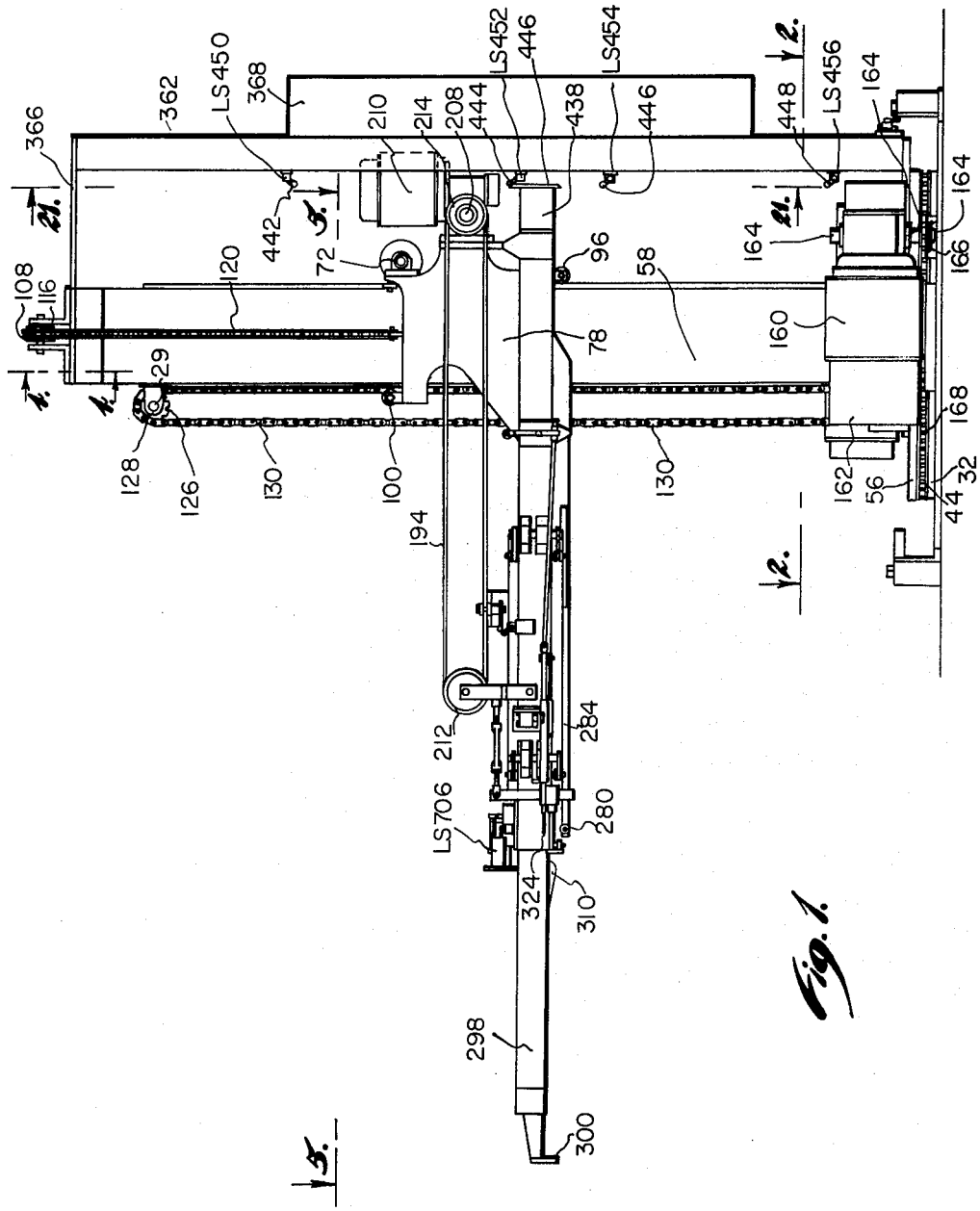
Figure 29:
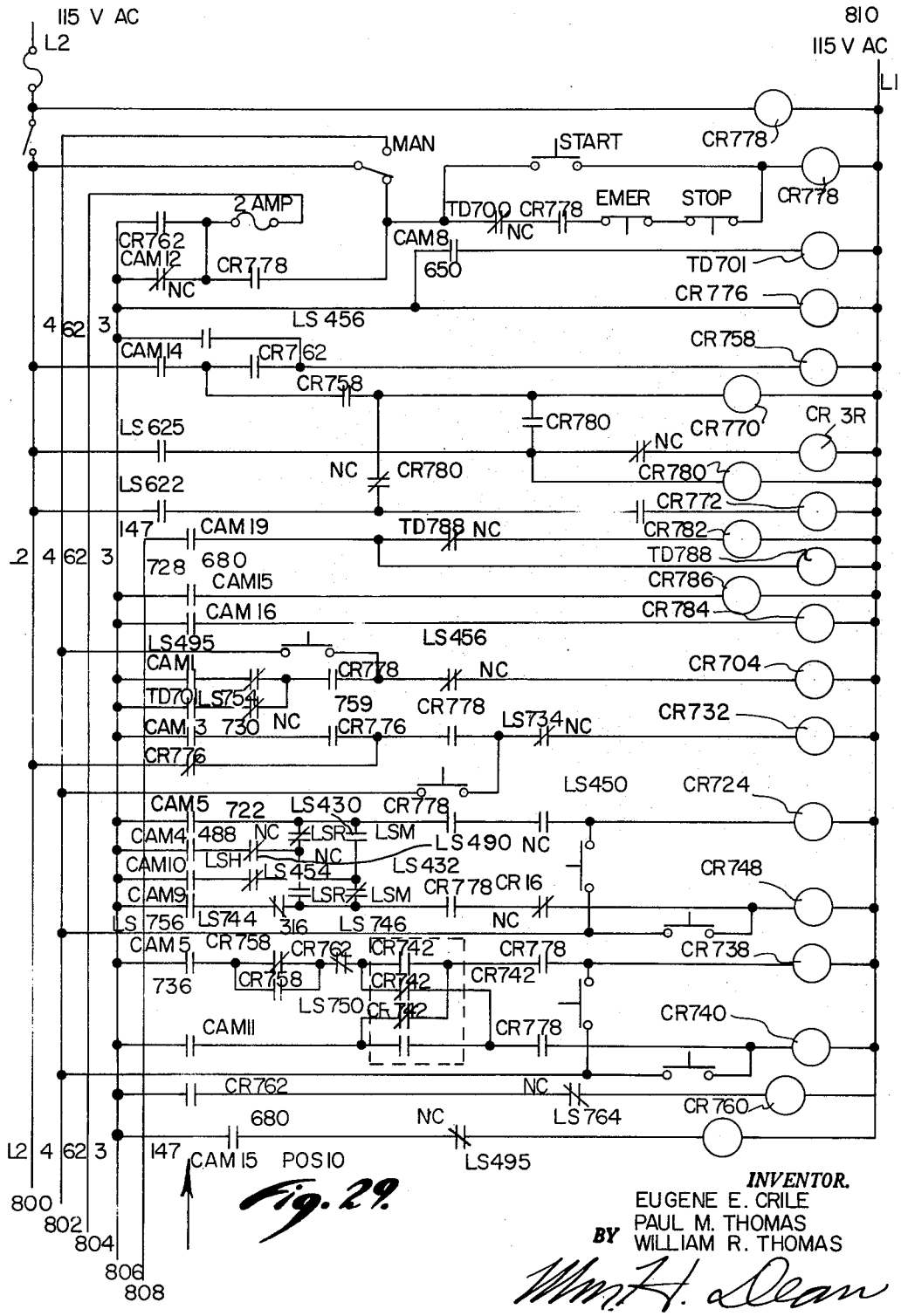
Figure 30:
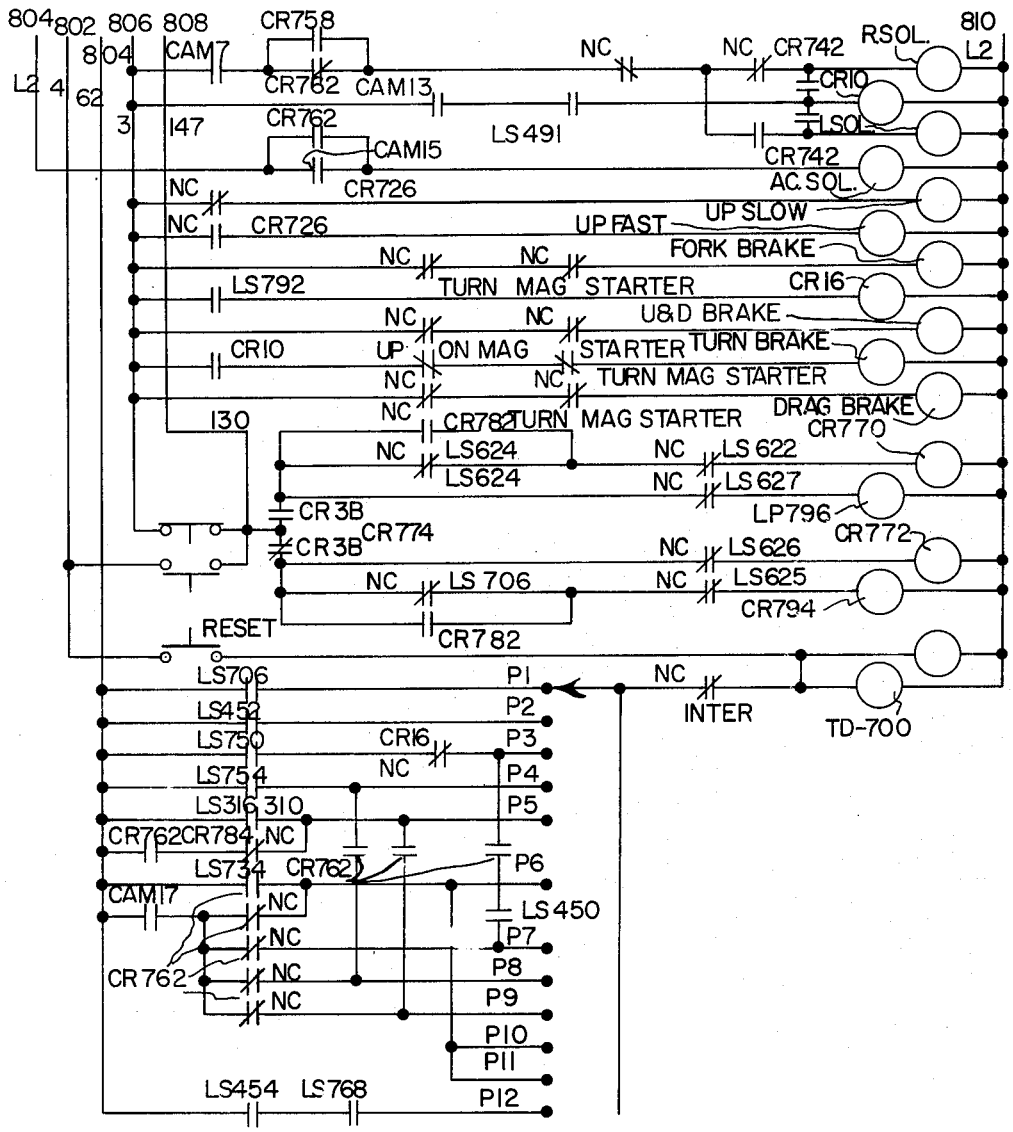
Figure 34:
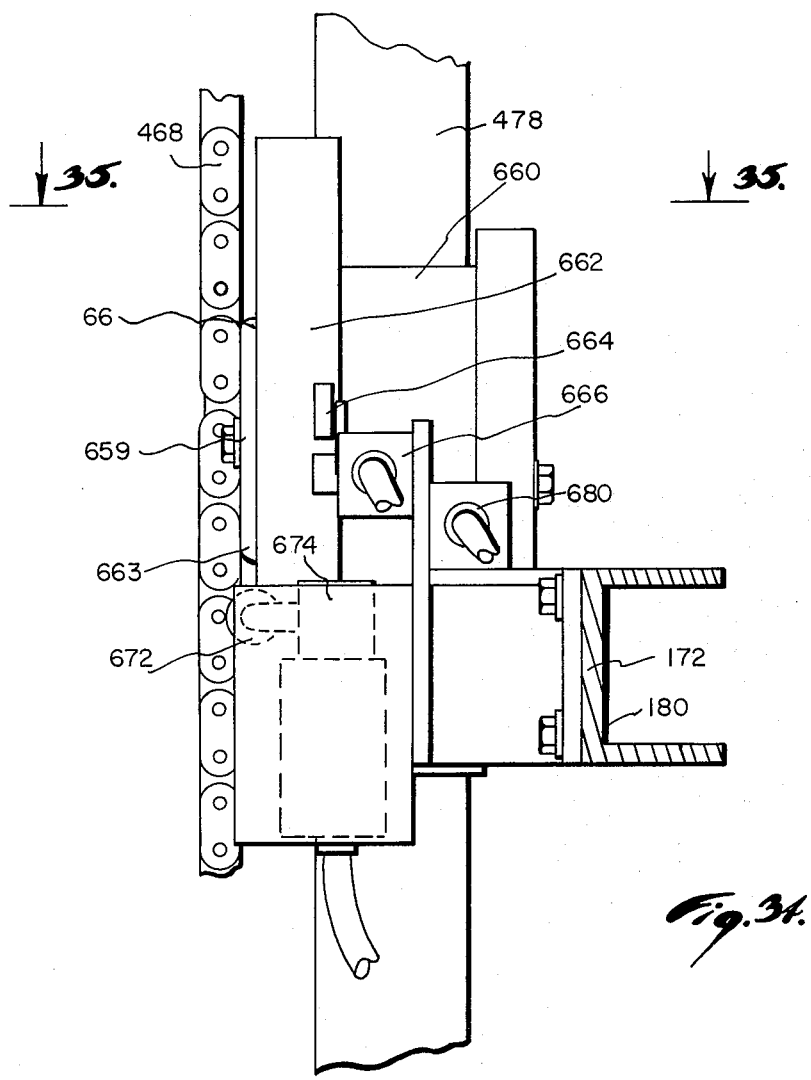

FIG. 16 is a view similar to FIGS. 14 and 15 but showing the pallet rack disposed on a motorized truck and illustrating the pallet carriage of the invention in a position immediately below the laden pallets as placed in accordance with the disclosure of FIG. 15 and whereupon empty pallets are retracted by said carriage from the shelf immediately below that on which the laden pallets have been deposited previously, as shown in FIG. 15, of the drawings;

FIG. 17 is a fragmentary side elevational view taken from the line 17—17 of FIG. 16, showing details of the pallet rack moving truck, one of which may be positioned on each opposite side of the machine, as indicated by arrows in FIG. 13 of the drawings;

FIG. 18 is a fragmentary plan sectional view taken from the line 18—18 of FIG. 17;

FIG. 19 is a fragmentary sectional view taken from the line 19—19 of FIG. 18;

FIG. 20 is a fragmentary sectional view taken from the line 20—20 of FIG. 18;

FIG. 21 is an enlarged fragmentary sectional view taken from the line 21—21 of FIG. 1;

FIG. 22 is an enlarged fragmentary sectional view taken from the line 22—22 of FIG. 5, showing the structure rotated substantially 180 degrees;

FIG. 23 is a plan fragmentary view of FIG. 22;

FIG. 24 is a view similar to FIG. 21 showing a modified form of the invention comprising a motorized and driven shelf height locating mechanism;

FIG. 25 is a fragmentary elevational view taken from the line 25—25 of FIG. 24;

FIG. 26 is a fragmentary plan view similar to FIG. 13 but showing a modification of the invention with respect to a novel and simplified means of laterally locating the pallet carriage of the machine with respect to shelves in a pallet rack and further illustrating portions broken away and in section to amplify the illustration; FIG. 26 further showing diagrammatically a conveyor and guide means more fully illustrated in FIGS. 32 and 33;

FIG. 27 is an enlarged fragmentary elevational view taken from the line 27—27 of FIG. 26 and showing details of the pallet conveyor mechanism omitted;

FIG. 28 is an enlarged fragmentary plan view showing a portion of the pallet handling carriage of the machine provided with converging locating mechanism disposed to align the carriage laterally with respect to a rack shelf for removing empty pallets from such shelves and accurately loading laden pallets therein;

FIG. 28A is a sectional view taken from the line 28A—28A of FIG. 28;

FIG. 29 is a schematic view of a portion of the electrical wiring of the pallet handling machine of the invention;

FIG. 30 is a schematic view of the remainder of the electrical wiring of the pallet handling machine in accordance with the disclosure of FIG. 29 and in accordance with the present invention;

FIG. 31 is a top or plan view of a conveyor and guide means for delivering pallets from a block producing machine and aligning the machine of the invention therewith; said conveyor and guide means also serving to align pallets with the machine of the invention;

FIG. 32 is a side elevational view of the conveyor and guide means, as shown in FIG. 31;

FIG. 33 is an enlarged side view of the modified shelf height locating mechanism of the invention taken from the line 33—33 of FIG. 24 to show the location only of the modified structure;

FIG. 34 is a fragmentary elevational view taken from the line 34—34 of FIG. 33; and FIG. 35 is a fragmentary top or plan view taken from the line 35—35 of FIG. 34.

As shown in FIG. 1 of the drawings, the pallet handling machine of the invention is provided with a base 32 having a central opening 34, as shown in FIG. 3 of the drawings. Disposed in this central opening 34 is an enlarged end 36 of a stub shaft 38.

The enlarged end 36 of the stub shaft 38 is welded in the opening 34 in the base 32 and a sprocket 40 is provided with a central opening 42 fitted around the enlarged portion 36 of the stub shaft 38 and the sprocket is also welded to said enlarged portion of the stub shaft 38. Thus, the sprocket 40 is held stationary on the base 32 and is provided with conventional sprocket teeth 44 about its periphery, as will be hereinafter described in detail.

Positioned on the stub shaft 38 are bearings 46 and 48 supported in collar structures 50 and 52, respectively, which are interconnected by a tubular section 54. Thus, the collars 50 and 52 are rigidly interconnected by the tubular section 54 and integral with the collar 50 is an extending substantially circular flange plate 56 which overlies the sprocket 40, all as shown best in FIGS. 1, 2, and 3 of the drawings.

Carried on the collar 50 and plate 56 is a hollow vertical column 58 which forms the main upstanding frame structure of the machine which is rotatable about a vertical axis provided by the bearings 46 and 48, hereinbefore described. These bearings 46 and 48 are radial load and thrust bearings and a cover 60 is placed and retained over the bearing 48 in order to exclude foreign matter therefrom, all as shown best in FIGS. 2 and 3 of the drawings.

Disposed externally of the hollow column 58 are vertical track rails 62, 64, 66, and 68. These track rails are traversed by frame carriage rollers 70, 72, 74, and 76, respectively, all as shown best in FIGS. 2, 5, and 6 of the drawings. These rollers are rotatably mounted on a carriage 78 which travels up and down on the column 58, as will be hereinafter described. The rollers 70 and 72 are mounted on a shaft 80, the opposite ends of which are journaled in bearings 82 and 84 mounted on the frame carriage 78, as shown best in FIGS. 1, 5, and 6 of the drawings. The rollers 74 and 76 are mounted on a shaft 86, the opposite ends of which are journaled in bearings 88 and 90 carried by the carriage 78, as shown best in FIGS. 5 and 6 of the drawings.

Lateral guide rollers 92 and 94 are revolvably mounted on the carriage 78 on axes at right angles to the axis of the shaft 80 and these rollers 92 and 94 engage edges of the track rails 62 and 64 at the upper portion of the carriage 78. Small rollers 96 are mounted on axles 98 near the lower portion of the carriage 78 and these rollers 96 bear against the track rails 62 and 64 directly below the rollers 70 and 72.

Additional rollers 99 and 100 are rotatably mounted on the frame carriage 78 and engage the track rails 66 and 68, respectively, directly above the rollers 74 and 76, respectively. Thus, the rollers 96, 99, and 100 tend to stabilize the vertical travel of the carriage 78 upwardly and downwardly on the column 58 while the rollers 70, 72, 74, and 76 carry the cantilever load of the structure supported by the frame carriage 78, as it travels upwardly and downwardly on the column 58, as will be hereinafter described in detail.

The weight of the carriage frame 78 and various mechanisms carried thereby is counterbalanced by a weight 102, shown in FIG. 4 of the drawings. This weight 102 is disposed to move upwardly and downwardly integrally of the hollow column 58 and is suspended by a single tree 104 to which chains 106 and 108 are coupled at 110 and 112, respectively. These chains engage sprockets 114 and 116 disposed at the upper end of the column 58; said sprockets having axes substantially aligned with the sides of the column 58 so that portions 118 and 120 of the chains extend downwardly and are connected by means of pins 122 and 124, respectively, which are coupled to portions of the carriage 78. Thus, the weight of the carriage 78 and the mechanisms carried thereon is substantially counterbalanced whereby vertical motorization of the frame carriage 78 upwardly and downwardly on the column 58 requires a minimum of power sufficient to overcome friction of the frame carriage mechanism and the loads to be carried thereby, as will be hereinafter described.

As shown in FIG. 1 of the drawings, a sprocket 126 is mounted on the side of the column member 58 near its upper portion and between the track rails 66 and 68. This sprocket 126 is rotatably mounted on a shaft 128 carried by a clevis structure 129, which may be welded or otherwise secured to the side of the column 58. Engaging this sprocket 126 is an endless chain 130 which passes over a sprocket 132 mounted on a shaft 134 near the lower end of the column member 58.

An intermediate portion of the chain 130 is secured to a fixture 136 on the inner side of a cross plate 138 of the frame carriage 78 whereby rotation of the shaft 134, as will be hereinafter described, causes the frame carriage 78 to be motivated upwardly and/or downwardly on the column 58 during operation of the machine of the present invention.

As shown in FIG. 2 of the drawings, the shaft 134 is carried at one end in a bearing 140, which is supported on the plate 56 and this shaft 134 is rotatably mounted in another bearing 142 mounted on the plate 56. A sprocket 144 is mounted on the shaft 134 and engaged by a chain 146 which also engages a sprocket 148 on an output shaft 150 of a reduction gear motor 152 which is controlled, as will be hereinafter described. This motor 152 is also provided with a brake 154 disposed to operate precisely to control the stopping of said motor for controlling accurate vertical placement of the frame carriage 78 with respect to the column 58, as will be hereinafter described in detail.

As shown in FIGS. 2 and 26, the motor 152 is provided with a mount 156 which is secured on the top of the plate 56 whereby the motor 152, together with the shaft 134 and sprocket chain 146 are rotatable with and carried by the plate about a vertical axis of the bearing 46 and 48, hereinbefore described.

The plate 56 also supports a bracket 158 carrying a motor 160 of the reduction gear type. This motor 160 is also provided with a brake 162.

As shown in FIGS. 1 and 2 of the drawings, the motor 160 is provided with an output shaft 164 carrying a sprocket 166 which drives a chain 168 engaging teeth 44 of the sprocket 40, hereinbefore described.

Inasmuch as the sprocket 40 is held stationary, torque reaction provided by rotation of the shaft 164 of the motor 160 causes actuation of the plate 56 rotatably about the vertical axes of the bearings 46 and 48 which also causes the frame carriage 78 to be pivotally moved about a substantially vertical axis in connection with the column 58.

Thus, the frame carriage 78 is pivoted about a vertical axis and is movable vertically, as hereinbefore described, by means of the drive chain 130 and connected mechanism including the motor 152, as hereinbefore described.

The frame carriage 78 comprises the cross plate 138 and another cross plate 166, as shown best in FIGS. 5 and 6 of the drawings. These cross plates 138 and 166, at their oppoiste ends, project substantially beyond opposite side plates 168 and 170 of the carriage 78. Connected to said opposite ends of the cross plates 138 and 166 are substantially channel-shaped in cross-section carriage track members 172 and 174 which are shown in cross section in FIG. 7 of the drawings. These carriage tracks 172 and 174 are held normally in a substantially horizontal position, as shown best in FIG. 6 of the drawings, and mounted in the channel-shaped tracks 172 and 174 are carriage rollers 176 and 178; there being a pair of the rollers 176, as shown in FIG. 5 of the drawings, and also a pair of the rollers 178, which support the carriage frame 180 which is thus reciprocally or telescopically movable with respect to the carriage tracks 172 and 174. The carriage 180 is provided with roller supporting members 182 and 184 which support the rollers 176 and 178, respectively, all these supports 182 and 184 are connected by a plate 186, all as shown best in FIGS. 5 and 6 of the drawings. This plate 186 is disposed at the outer end of the roller supports 182 and 184 at an end of the carriage 180 which is farthest from the frame carriage 78.

Secured to the roller supports 182 and 184 of the carriage 180 are brackets 188 and 190 which are fixed to actuating belts 192 and 194 by means of clips 196 and 198. These clips are similar. The clip 198, as shown in FIG. 6 of the drawings, is secured to the bracket 190 by means of a bolt 200, thus, clamping the belts 194 to the bracket 190 and thereby providing a fixed connection of the carriage 180 to the belts 192 and 194. These belts 192 and 194 are endless belts.

The belts 192 are mounted on double sheave pulleys 202 and 204. The pulleys 202 are supported by stationary brackets 206 mounted on the roller track 172 while a double sheave pulley 204 is mounted on a shaft 208 driven by a motor 210, all as shown best in FIGS. 5 and 6 of the drawings. The belts 194 are mounted on double sheave pulleys 212 and 214. The pulleys 212 are rotatably supported on a bracket 216 mounted on the roller track 174 and the multiple sheave 214 is mounted on the shaft 208 driven by the electric motor 210.

This electric motor 210 is provided with a conventional electric brake for controlling movement of the pulleys 204 and 214 and the respective belts 192 and 194. Thus, the carriage 180 is powered longitudinally of the roller supporting tracks 172 and 174, whereby the rollers 176 and 178, supported therein, rotatably support the carriage 180 as it may be projected longitudinally of the roller supports 172 and 174, as will be hereinafter described in detail.

The pulley brackets 206 and 216, as shown in FIGS. 5 and 6 of the drawings, are pivotally mounted at their lower ends on bolts, such as the bolt 218, which connects the lower end of the bracket 216 to the roller track 174. A turnbuckle 220 is connected to the bracket 216 and supported at its opposite end by a fixed bracket 222 which is fixed to the roller track 174. The turnbuckle 220 may be adjusted to provide for proper tension of the belts 194. A turnbuckle 224 is supported by a bracket 226 and is connected to the pulley-supporting bracket 206 for the purpose of tensioning the belts 192.

It being noted that the turnbuckles 220 and 224 are similar in structure and function.

Figure 7:
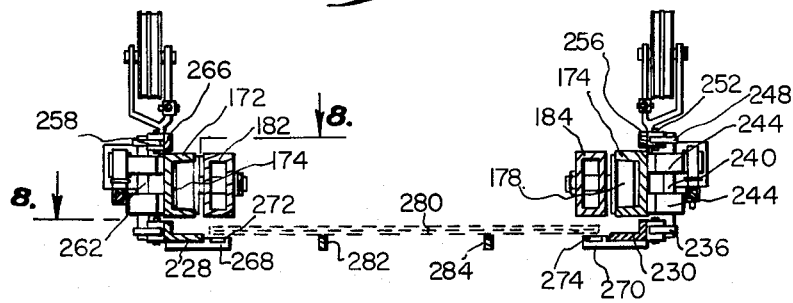
FIG. 7 is a fragmentary sectional view taken from the the line 7—7 of FIG. 5.

As shown in FIGS. 5, 6, and 7, pallet centering bars 228 and 230 are pivotally supported below the roller tracks 172 and 174, respectively, and operate to center pallets between the roller tracks 172 and 174, as will be hereinafter described in detail.

The pallet centering bar 230 is provided with pivot pins 232 and 234 extending through arms 236 and 238 fixed to respective shafts 240 and 242 which are carried in bearings 244 and 246 mounted on the outer side of the roller track 174.

Mounted on the upper ends of the shafts 240 and 242 are bell cranks 248 and 250 pivotally connected by pins 252 and 254 to a bar 256. This bar 256, pivotally connected to the bell cranks 248 and 250, maintains a parallel pivotal action of the pallet centering bar 230 relative to the roller track 174. Similar bell cranks 258 and 260 are mounted on shafts 262 and 264, similar to the shafts 240 and 242, hereinbefore described. These shafts 262 and 264 support arms similar to the hereinbefore described arms 236 and 238 and support the pallet centering bar 228 in opposed relation to the pallet centering bar 232.

Interconnecting the arms 258 and 260 is a bar 266 similar to the bar 256, hereinbefore described.

Fixed to the pallet centering bars 228 and 230 are cam track members 268 and 270, respectively, having internal tracks 272 and 274, respectively. These internal tracks 272 and 274 are engageable by rollers 276 and 278 on the carriage 180 when retracted toward the frame carriage 78, all as shown best in FIGS. 5, 7, and 8 of the drawings.

Figure 8:
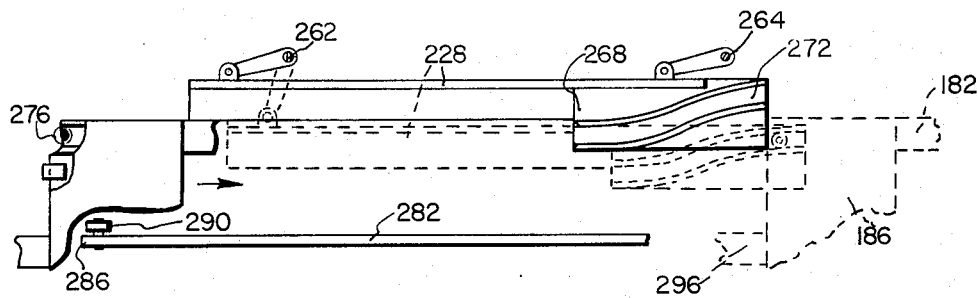
FIG. 8 is an enlarged plan sectional view taken from the line 8—8 of FIG. 7, showing the structure disclosed therein rotated substantially 90 degrees from that as disclosed in FIG. 7.

When the rollers 276 and 278 engage the internal tracks 272 and 274, they cause inward movement of the pallet centering bars 228 and 230 into a broken line position, as shown in FIG. 8, wherein the bar 228 is illustrated. Thus, the bars 228 and 230 move toward each other and tend to center pallets therebetween, as indicated by broken lines 280, in FIG. 7 of the drawings. The internal tracks 272 and 274 are joggled laterally of the pallet centering bars 228 and 230 so that rectilinear movement of the rollers 276 and 278 longitudinally of the roller track members 172 and 174 cause inward movement of the pallet centering bars 228 and 230, as indicated by broken lines A, in FIG. 8 of the drawings.

Fixed to the cross plate 138 are a pair of pallet receiving bars 282 and 284 which are provided with extending ends 286 and 288 disposed in close proximity to extending ends of the roller track members 172 and 174. These pallet supporting bars 282 and 284 are disposed between the pallet centering bars 228 and 230 and are provided with rollers 290 and 292, at said extending ends 286 and 288. These rollers 290 and 292 are disposed to provide for the movement of pallets thereover when such pallets are raked from pallet racks and into the position as indicated by broken lines 280, in FIG. 7 of the drawings.

Figure 9:
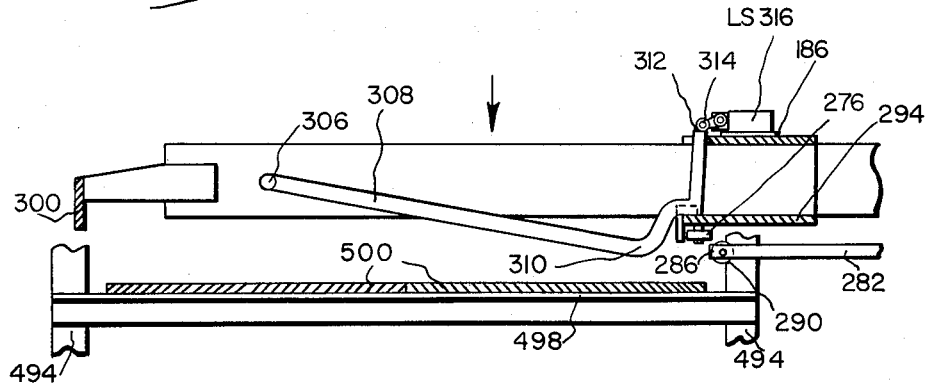
FIG. 9 is an enlarged fragmentary sectional view taken from the line 9—9 of FIG. 5.

As shown in FIGS. 6 and 9 of the drawings, the carriage 180 is provided with a cross plate 294 which is disposed directly below the hereinbefore described cross plate 186. This cross plate 294 supports the rollers 276 and 278 in proper elevation to engage the internal tracks 272 and 274 of the cam members 268 and 274.

The plate 294 also provides, together with the plate 186, a connection between the roller-supporting members 182 and 184 and pallet carrying and retracting arms 296 and 298, which are welded or otherwise secured between the plates 186 and 294, which, in turn, are preferably welded or otherwise secured to the roller-supporting members 182 and 184.

The pallet carrying and retracting arms 296 and 298 are provided with upper surfaces disposed to carry laden pallets, as will be hereinafter described, and a hook structure 300 interconnects the outer ends 302 and 304 of the arms 296 and 298. This hook structure 300 is disposed to engage and retract unladen pallets from racks, as will be hereinafter described in detail.

Pivotally mounted on the pallet carrying and retracting arms 296 by means of a bolt 306 is an empty pallet engaging arm 308 which forms part of the shelf-height locating mechanism of the present machine and this arm 308 is provided with a pallet engaging portion 310 which causes upward pivotal movement of the arm 308 about the axis of the bolt 306 when the upper surface of the pallet is engaged, whereby a switch actuating end 312 of the arm 308 operates a roller arm 314 of a switch 316 of the shelf-height locating mechanism, all as will be hereinafter described in detail.

Mounted on the roller track member 174 and supported at the outer side thereof on a plate 317 is a tubular slide bearing 318 of a pallet rack shelf locating mechanism of the invention. Slidably mounted in the tubular slide bearing 318 is a rod 320 having a limit switch 322 mounted on the outer end thereof and this limit switch 322 is provided with a pivot switch actuating arm 324, as will be hereinafter described. A spring 326, connected to the plate 317 and to a bolt 328, tends to retract the bar 320 through the tubular slide bearing 318 in a direction of an arrow B, in FIG. 11 of the drawings, all as will be hereinafter described in detail. The tubular slide bearing 318 is provided with an opening 330 through which an armature 332 of a solenoid 334 projects. This armature 332 is a latch member engaging a notch 336 in the bar 320, tending to hold it in latched position, as shown in FIG. 11, under tension to the spring 326, which tends to move the rod 320 in the direction of the arrow B, as hereinbefore described. Connected to the rod 320 is a smaller rod 338 having its opposite end slidable through a slide bearing 340 pivotally mounted by a pin 342 to a lower end of a lever 344 which is pivotally mounted by means of a bolt 346 on one side of the roller track 174. The small rod 338 is provided with a head 347 which engages one end of the slide bearing 340 for retracting the rod 338 and the rod 320 into the latched position shown in FIG. 11, wherein the latch member 332 of the solenoid 334 engages the notch 336 in the bar 320.

The lever 344 is provided with a roller 348 on its upper end engageable by a shoe 350 supported by the bolt 200 and connected to the bracket 190, shown in FIGS. 6 and 11 of the drawings.

It will be seen that when the bracket 190 moves backwardly toward the column 58, with retraction of the carriage 298, that the shoe 350 engages the roller 348 on the lever 344 and moves it backwardly to a broken line position 352. This merely causes movement of the slide bearing 340 along the rod 338 toward the spring 326, but does not effect operation of the bar 320.

When the plate 350 moves away from the column 58, during projection of the carriage 298, then the shoe 350 engages the roller 348 and the lever 344 to a broken line position 354 whereupn slide bearing 340 engages the enlarged head 347 of the rod 338 and retracts the bar 320 until the notch 336 thereof passes the armature 332 of the solenoid 334 thereby latching the switch 322 into a retracted position.

As will be hereinafter described, the solenoid 334 is energized to permit release of the bar 320 and to permit the tension of the spring 326 to project the switch 322 and arm 324 into position to engage an upstanding member of the pallet rack when the carriage 298 is swung about a vertical axis of the column 58 and into register with a space between upstanding members of a pallet rack wherein pallet shelves are disposed.

While the sleeve 318 acts as a slide bearing for the mounting and projecting movement of the switch 322 and arm 324, a similar bearing sleeve 356 slidably supports a switch 358 and an arm 360. The mechanism disposed to actuate the switch 358 and arm 360 to project it outwardly into a position to engage an upstanding member of a pallet rack is similar to the mechanism hereinbefore described in connection with the switch 358 being supported on the roller track member 172, all as shown best in FIG. 5 of the drawings.

As shown in FIGS. 1 and 2 of the drawings, the machine is provided with uprights 362 and 364 disposed rearwardly of the column 58 and having their normally lower ends welded or otherwise secured to the plate 56. The upper ends of the uprights 362 and 364 are welded or otherwise secured to a plate 366 which is fixed to the upper end of the column 58.

Supported by the uprights 362 and 364 is a control panel box 368 wherein all of the electrical controls are carried. It will be seen that the control panel box 368 is disposed rearwardly of the motor 210 so that the motor 210 clears the box and is capable of moving freely up and down relative thereto.

Adjacent the upright 364 is an upright 370 which may be a solid bar or a hollow bar structure, as shown best in FIGS. 2, 21, 22 and 23. This bar is disposed to support a vertically movable shelf-height locating mechanism thereon, as will be hereinafter described.

Referring to FIGS. 21, 22, and 23, it will be seen that the bar 370 is adjacent the upright 364 and that it is disposed in a substantially vertical position.

Vertically movably mounted on this bar 370 is a shelf-heighth locating carriage 372 having rollers 374 and 376 engaging one side of said bar and rollers 378 and 380 engaging the other side of the bar whereby the friction of the shelf-heighth locating carriage 372, when moving up and down the bar 370, is reduced to a minimum.

Projecting arms 382 carry a pivot pin 384 which serves as a fulcrum for a latch lever 386 having a lower end 388 engageable with projections 390 fixed to and vertically spaced on the bar 370 to approximate elevational locations of shelves in pallet racks, as will be hereinafter described in detail. The shelf-heighth locating carriage 372 is provided with a spring holding bar 392 on which a plate spring 394 is mounted. This plate spring 394 is engageable by an upper end 396 of the lever 386 tending to hold the lever in the solid line position whereby its lower end is maintained in engagement with one of the projections 390 fixed on the vertical bar 370.

Supported by the shelf-heighth locating carriage 372 is a switch actuating arm 398 having a plate 400 engageable with a roller 402 of a limit switch 404 which is carried by the carriage 78, hereinbefore described. Thus, the switch 404 and its roller arm 402 moves up and down with the carriage 78.

Also supported on the frame carriage 78 is a solenoid 406 having a reciprocating plunger 408 pivoted by means of a pin 410 to a lever 412 which is pivotally mounted on a fulcrum pin 414. This fulcrum pin 414 is stationarily supported on a suitable bracket carried by the carriage 78 and mounted on the lever 412 is a roller 416 adapted to engage a bar 418 on the upper end of a lever 386 whereby the lever 412 may roll past the bar 418 on the upper end of the lever 386 as the carriage 78 moves up and down relative to the shelf-heighth locating carriage 372, as will be hereinafter described in detail.

The upper end of the lever 412 is also provided with a similar bar 420 at its upper end. Thus, the levers 386 and 412 are provided with the bars 418 and 420, respectively, so that they may effectively slide past each other with relative movement of the shelf-height locating carriage 372 and the carriage 78, all as will be hereinafter described in detail.

A spring 422 is coupled to the lever 412 tending to hold the bar portion 420 thereof away from the upwardly projecting portion 396 of the lever 386. Thus, when the solenoid 406 is de-energized, the spring 422 will tend to hold the lever bar portions 420 out of interference with the upper end portion 396 of the lever 386, all as will be hereinafter described in detail.

The shelf-heighth locating carriage 372 is provided with a switch actuating arm 424 which is disposed to contact rollers on switch arms 426 and 428 of switches 430 and 432, respectively, in order to control the vertical direction of movement of the frame carriage 78 relative to the level at which a conventional concrete block machine delivers laden pallets and relative to the spaced vertical shelves of pallet racks which lie above and below the level of the delivery location of the concrete block producing machine, all as will be hereinafter described in detail.

As shown in FIG. 23 of the drawings, the switch 404, solenoid 406, and the bracket supporting the lever 412 are carried by a bracket 436 supported on the normally rear end of the roller track 172, all as shown best in FIGS. 5 and 23 of the drawings.

In operation of the shelf-heighth locating mechanism, shown in FIGS. 22 and 23 of the drawings, the solenoid 406 is electrically connected to the switch 316 whereby actuation of this switch 316 by the lever 310 causes retraction of the armature 408 of the solenoid 406 which pivots the lever 386 and permits the shelf-heighth locator carriage 372 to drop downwardly until an end 388 of the lever 386 engages the next lowest projection 390 on the bar 370. Thus, the shelf-heighth locator carriage 372 drops down to a position corresponding with unladen pallets located by engagement of the lever 310 whereupon the machine may subsequently return to such position with laden pallets. This is accomplished by downward movement of the carriage 180 until the switch 402 contacts the plate 400 whereupon the carriage 180 will be stopped at a level corresponding with the empty pallets previously engaged by the lever 310.

Projecting from the normally rear end of the roller track 172 is a switch actuating arm 438 having a switch engaging plate 440 thereon. This switch engaging plate 440 is disposed in alignment with and adapted to engage actuating rollers 442 and 444 of switches 450 and 452, stationarily supported on the upstanding member 364, all as will be hereinafter described in detail.

An arm 458, similar to the arm 438, is carried by the normally rear end of the roller track 174 and supported on this arm 458 is a plate 460 which is similar to the plate 440, hereinbefore described. This plate 460 is adapted to actuate roller arms 446 and 448 of switches 454 and 456, stationarily mounted on the upstanding member 362.

Thus, the switches 450, 452, 454, and 456 are disposed stationarily with respect to the relatively movable carriage 78 and thus, these switches are actuated in accordance with the vertical movement of the frame carriage 78 up and down on the column 58, as will be hereinafter described in detail.

In the modification of the invention, as shown in FIGS. 24 and 25 of the drawing, novel shelf-height locating mechanism is disclosed and this mechanism includes means for vertically powering a shelf-height locating means in response to operation of the switch 316, hereinbefore described, when a pallet is engaged by the arm 310, all as shown in FIG. 9 of the drawings.

As shown in FIG. 24 of the drawings, a bracket 459 supported by the column 58, carries a gear motor 461 having an output shaft 462 driving a slip clutch-type sprocket 464. The motor 461 is provided with an electric brake 466 disposed to stop the shaft 462 precisely and to thereby hold the sprocket 464 and a chain 468 engaged thereby. The motor 461 is provided with a conventional worm gear head which automatically holds a fixed position of the chain 468 when the motor 461 is stopped by the brake 466.

The chain 468 is an endless chain extending around the sprocket 464 and another sprocket 470 rotatably supported on a shaft 472 supported in bearing brackets 474 and 476 mounted on the plate 56, as hereinbefore described. Adjacent the chain 468 is an upstanding bar 478 on which a switch actuating shelf-height locator carriage 480 is vertically movably mounted. This carriage 480 is provided with rollers 482 and 484 running on opposite sides of the bar 478, in order to reduce friction of the carriage 480 on the bar 478.

Supported on the carriage 480 is a switch actuating plate 486 disposed to engage a roller arm 488 of a switch 490 carried by the roller track 172 of the frame carriage 78.

The roller arm 488 of the switch 490 actuates said switch 490 in two directions. For example, when the carriage 480 moves downwardly with respect to the roller arm 488, the lower end of the plate 486 contacts the roller arm 488 and moves it in one direction thereby actuating the switch 490, while the switch 490, when moving downwardly with respect to the shelf-heighth locator carriage 480, causes the roller arm 488 to engage the upper edge of the plate 486. Thus, contacts in the switch 490 are operable by engagement of the roller arm 488 with the plate 486 depending upon the relative movement of the carriage 480 and the frame carriage 78 and its roller track 172, as shown in FIGS. 24 and 25 of the drawings.

The plate 486, when it contacts the roller arm 488 and actuates the switch 490, energizes the motor 152 to a lower speed operation so that the carriage 78 may be decelerated as it approaches a location corresponding to one of the shelves of the pallet racks, shown in FIGS. 14, 15, and 16. Thus, when the carriage 78 is moving in either direction, up or down, the plate 486 actuates the switch 490 to energize the motor 152 at low speed and thereby decelerate action of the carriage 78.

A switch 491 having a roller contact arm 493 is operable by engagement with the plate 486 when the carriage 180 moves downwardly to stop operation of the motor 152 when the carriage 180 reaches a predetermined elevation. This action also takes place when the carriage is moving upwardly to a given shelf-heighth location.

A switch 495 carried by the carriage 180 is provided with a roller contact arm engageable by a projection 497 carried by the plate 486 and this projection 497 actuates the switch 495 when the shelf-heighth locating carriage 480 is moved downwardly on the bar 478 by actuation of the motor 461 energized through the closing of the switch 316, hereinbefore described. When the switch 316 is energized by engagement of the lever 310 with the pallet 500, the motor 461 is energized to move and power the shelf-heighth locating carriage 480 downwardly and when the carriage 480 moves downwardly a sufficient distance to cause the projection 497 to actuate the switch 495, then this switch de-energizes the motor 461 whereupon its gear head 463, shown in FIG. 24 of the drawings, holds the shelf-height locating carriage 480 in fixed position so that the switch 491 may subsequently be actuated in order to stop operation of the motor 152 and bring the carriage 180 into position so that it may correspond with the elevation of one of the shelfs in the pallet racks, as shown in FIGS. 14, 15, and 16 of the drawings.

As shown in FIG. 24 of the drawings, the switches 430 and 432 are similar to those shown in FIG. 22 of the drawings. These switches 430 and 432 are stationarily mounted on an upstanding member 489 and are provided with the arms 426 and 428, as hereinbefore described. These double ended roller contact arms 426 and 428 are engageable by a projecting member 492 carried by the carriage 180 whereby the operation of the frame carriage 78 upwardly and downwardly above and below the delivery level of a concrete block machine may be controlled, as will be hereinafter described in detail.

It will be appreciated from the disclosures of FIGS. 24 and 25 of the drawings, that the chain 468 positively drives the switch actuating carriage 480 upwardly and downwardly on the bar 478 and that the motor 461 initially energized by operation of the switch 316 and provided with its electric brake 466 may accurately be used to stop the carriage 480 precisely in any location vertically on the bar 478 in correspondence with the level of a pallet rack shelf, as hereinbefore described.

The present invention includes novel means for laterally locating the pallet carriage of a machine with respect to pallet supporting shelves of pallet racks. Such mechanism being shown in detail in FIGS. 10, 11, 12, 14, 15, 16, and in FIGS. 26, 27, and 28, wherein a modification of such a mechanism is disclosed.

These mechanisms for laterally locating the pallet carriage of a machine with respect to the shelves of pallet racks must operate in conjunction with pallet racks having vertical members 494 which are interconnected by angle members 496 having oppositely directing flanges 498 forming shelves for pallets 500. These pallets 500 are placed on the shelves 498 carrying freshly formed concrete blocks, subsequently the pallets 500 on the next lower shelf are removed and replaced by pallets carrying freshly formed concrete blocks, all of such operations being accomplished automatically by the machine of the invention. The shelf angle portions 498 are oppositely directed toward each other and are in properly spaced relationship to receive the pallets 500, the opposite edges of which are provided with a substantial amount of tolerance between the angle members 496, thus permitting some tolerance in the operation of the machine of the invention.

The angle members 496, as shown in FIGS. 12, 14, 15, 16, and 28 of the drawings, in addition to having their horizontal shelf portions 498 disposed horizontally, are provided with vertically extending angle legs 402 between which opposite edges 504 of the pallets 500 are located.

The vertically disposed legs 502 of the angles 496 also serve as guides between which lateral locator mechanism of the machine finds its way into each shelf of the pallet rack, as will be hereinafter described in detail.

With respect to the mechanism shown in FIGS. 5, 6, and 12, of the drawings, it will be seen that the switch 358 and pivoted arm 360 thereof may engage one of the angle legs 502 when the carriage is moving in a direction of an arrow A, in FIG. 2 of the drawings, and that in the opposite direction, the arm 324 of the switch 322 may be operable in a similar manner to locate each shelf of the pallet rack so that the motor 160, as hereinbefore described, may be controlled to pivot the column 58 around a vertical axis in order precisely to locate the pallet carriage 180 in alignment with the shelf angles 496 so that laden pallets 500 may be placed thereon and unladen pallets may be removed therefrom, as will be hereinafter described in detail.

The switches 322 and 358 are thus projected mechanically as hereinbefore described in connection with FIG. 11, as the carriage swings about a vertical axis toward each shelf of the pallet rack.

The modified shelf locating mechanism, as shown in FIGS. 26, 27 and 28 of the drawings, comprises means for controlling the motor 160 whereby it is stopped substantially at a location wherein the arms 296 and 298 of the carriage 180 align with the shelf angle members 496 so that the arms 296 and 298 may be projected therebetween. This modified mechanism also includes subsequently described spring loaded wedge mechanism which wedges itself between the angles 496 and thus causes the entire carriage structure to pivot about the axis of the column 58 in order to swing the carriage into final precise alignment with the respective rack shelf as the arms 296 and 298 are projected between the shelf angles 496.

This operation comprises further switching means in control of the motor 160 so that after it has stopped at an approximate location, the brake on the motor 160 is released permitting the projection of the members 296 and 298 between the angle members 496 for swingably moving the carriage arms 296 and 298 into precise location between the angles 496.

This mechanism, as shown in FIGS. 27, 28, and 28A, comprises pivoted arms 506 and 508 which are pivotally mounted on brackets 510 and 112 which are welded, or otherwise fixed to the arms 296 and 298, all as shown best in FIG. 28 of the drawings.

The arm 506 is pivotally mounted on the bracket 510 by means of a pin 511 while the arm 508 is pivotally mounted on a pin 514 carried by the bracket 510.

It will be seen that the arms 506 and 508 are disposed in converging relationship to each other in a direction toward the shelf angles 496 and that these arms 506 and 508 are provided with engaging plates 516 and 518, respectively, which are disposed to engage between edges of the shelf angles 496. Thus, the converging plates 516 and 518 are disposed to wedge between opposed edges of horizontal portions 498 of the shelf angles 496 while tension springs 520 and 522 tend to hold the arms 506 and 508 in converging disposition, tending to prevent pivotal movement of the arms to broken line positions B and C, to which positions they are forced by wedging action when moved between the legs 498 of the opposed shelf angles 496. The springs 520 and 522 are supported on the bracket 510 by means of secondary brackets 524 and 526, respectively.

Stop screws 528 and 530 are carried by the bracket 510 and are respectively located to provide stops for the arms 506 and 508 so that in the event the carriage is unduly misaligned with the shelf angles 496 that when one of the arms 506 or 508 engages its respective stop screw 528 or 530, positive action will take place to swing the carriage arms 296 and 298 about a vertical axis of the column 58 and thereby bring the carriage into alignment between the shelf angles 496.

Rollers 532 and 534 are pivotally mounted on the extending ends of the arms 506 and 508 by pivot pins 536 and 538, respectively. These rollers 532 and 534 roll on and between the inner edges of the opposed shelf portions 498 of the shelf angles 496.

Attention is directed to FIG. 28A when the rollers 532 and 534 engage inner edges 540 and 542 of the shelf portions 498 of the shelf angles 496.

It will be understood that when the carriage, including the members 296 and 298 and the arms 506 and 508, are moved downwardly between the upstanding legs 502 of the shelf angles 496, that the rollers 532 and 534 move downwardly therebetween while the lower end portions 544 of the pins 511 and 514 act to engage edges of pallets in a similar manner to that of the hook 300, hereinbefore described, for retracting the empty pallets from the rack and onto the bars 282 and 284, all as will be hereinafter described in detail.

In the modification, as shown in FIG. 27 of the drawings, the arms 282 and 284 are provided with stop portions 546 disposed to limit the rearward movement of a first pallet 548 when it is raked backwardly onto the arms 282 and 284 by the pins 511 and 514 at their lower downwardly extending portions 544, shown in FIG. 27 of the drawings.

The rollers 290 and 292 on the arms 282 and 284 serve to receive the pallets, as indicated by broken lines in FIG. 27, and when the first pallet engages the stop portions 546, it drops down at its edge adjacent the rollers 290 and 292 whereupon the edge 548 of the next pallet passes over the top of the lower pallet and is moved backwardly thereon until the carriage is fully retracted into a position substantially as shown in FIG. 27 of the drawings.

As the downwardly extending portion 544 of the pins 511 and 514 move backwardly with the retraction of the carriage, vertically slidable pins 550 and 552, at their lower ends 554, slide over the upper surface of the first pallet to be raked into position in engagement with the stop portions 546. Subsequently, lower end portions 544 of the pins 550 and 552 pass beyond the stop 546 and drop downwardly to a position below the lowermost pallet engaging the stop 546 whereupon the carriage, as it is projected toward a concrete block machine 556, carries the pins 550 and 552 thereby pushes the pallets off and away from the stop portions 546 of the arms 282 and 284, whereupon these pallets are returned to the machine 556 by the pins 550 and 552.

These pins 550 and 552 are vertically slidably mounted in sleeve bearings 558 and 560 carried by arms 296 and 298 of the carriage 180.

As shown in FIG. 27, the pins 550 and 552 assume a broken line position C when the lower ends 554 are resting on pallets being retracted into engagement with the stop portions 546 of the arms 282 and 284.

As shown in FIG. 13, the machine of the invention transfers laden pallets from a concrete block producing machine to shelves of pallet racks, as hereinbefore described.

As shown in FIG. 13, the carriage 180 of the invention swings from a position in alignment with the concrete block producing machine 556 substantially 90 degrees into a broken line position 562 wherein the carriage is in position to deliver laden pallets to the rack shelves, as shown in FIGS. 14 and 15 of the drawings, and to retract unladen pallets from the racks, as shown in FIG. 16 of the drawings. The uprights 494 of each pallet rack are provided with lower ends 564 which are carried in angle members 566 and 568 of a rack carriage 570 which is disposed intermittently to move the bays of shelves in said racks successively into a position wherein the carriage 180 of the machine may deliver laden pallets to shelves of the rack when the machine swings the carriage into the broken line position 562, as shown best in FIG. 13 of the drawings.

The rack carriage 570 is provided with peripherally V-shaped supporting rollers 572 and 574 supported in conjunction with the angle members 566 and 568, respectively. These rollers 572 and 574 run on angle tracks 576 and 578, respectively. These angle tracks 576 and 578 are disposed so that the apex of the angle is directed upwardly and whereby any foreign matter which falls upon these tracks will gravitate away from the area traversed by the grooved roller wheels 572 and 574.

In order to prevent lateral displacement of the rollers 572 and 574 relative to the tracks 576 and 578 the rack carriage is provided with additional annular V-shaped rollers 580 and 582 which are disposed axially at right angles to the rollers 572 and 574. These rollers 580 and 582 engage angle tracks 584 and 586 which are supported on a base plate 588 on which the angle tracks 576 and 578 are fixed, either by welding or other suitable means. The rollers 580 and 582 are carried by respective brackets 589 and 590 fixed by welding or other means to the angles 566 and 568 which support the lower ends 564 of the rack upright members 494.

Secured by welding, or other suitable means, to the angle members 566 and 568 is a motor supporting frame 592 on which a reduction gear motor 594 is mounted. This motor 594 is provided with an output shaft 596 carrying a sprocket 598 on which a chain 600 is engaged. This chain 600 passes over a sprocket 602 fixed on an axle 604 having sprockets 606 and 608 on opposite ends thereof. These sprockets 606 and 608, at their peripheral teeth portions, are engaged in link chains 610 and 612 which are fixed on the upper surface of the plate 588 and serve as racks in which the sprockets 606 and 608 find traction for the motivation of the rack carriage 570 in a direction of an arrow 614, shown in FIG. 13 of the drawings.

The angle members 566 and 568 of the rack carriage 570 are provided with divergingly flared portions 616 and 618 between which the upright members 494 are slidably positioned by means of a conventional truck, not shown, and which is no part of the present invention. The pallet rack, at its rearmost upright members 494, is forced into engagement with the frame 592, thereby positively locating the pallet rack with respect to the frame 592 so that control switches operating with respect thereto, will position bays of the pallet rack shelves successively in alignment with a broken line position 562 of the carriage 180, as shown in FIG. 13, all as will be hereinafter described in detail.

As shown in FIGS. 17, 18, and 20, an upstanding support structure 620 is mounted on the base plate 588 and carries switches 622, 624, and 626. These switches are provided with roller contact arms 628, 630, and 632, respectively. These arms 628, 630, and 632 are engageable with angle clips 634, one of which corresponds with each bay of rack shelves between the upstanding members 494 of each rack, as hereinbefore described. Thus, each clip 636 actuates the switches 628, 630, and 632 as each bay of rack shelves is advanced relative to the switches and into the broken line position 562, as hereinbefore described.

The clips 636 are carried by a bar 638 supported on the rack carriage by outwardly extending arms 640, shown best in FIG. 18 of the drawings.

The bar 638, as shown in FIGS. 18 and 20 of the drawings, carries switch actuating members 642 and 644 near opposite ends thereof which correspond with the end locations of pallet racks carried by the pallet carriage and these members 642 and 644 correspond with locations of the arms 628 and 632 of the switches 622 and 626, respectively. These arms 628 and 632, as shown in FIG. 20, are disposed below the arm 630 of the switch 624 whereby the arm 630 is actuated by any one of the clips 636. The arms 628 and 632 of the switches 622 and 626 being operable by the members 642 and 644 carried on the bar 38. Operation of the switches 622, 624, and 626 with relation to the clips 636 and switch actuating members 642 and 644 will be hereinafter described in detail, in connection with the advancement of the bays of shelves in the pallet racks as related to their successive movement into the broken line position 562, as shown in FIG. 13 of the drawings.

In the modified shelf-heighth locating mechanism, as shown in FIGS. 33, 34, and 35, the vertical bar 478 and the power driven chain 468 are similar to the structures shown in FIGS. 24 and 25 of the drawings. Operation of the power driven chain 468 is accomplished by the motor 461 and attendant equipment disclosed in FIGS. 24 and 25 of the drawings.

The chain 468 is fixed to a shelf-heighth locating carriage 660 which is verically slidable on the bar 478 in a similar manner to the slidable mounting of the carriage 480, hereinbefore described.

Mounted on the shelf-heighth locator carriage 660 is an elongated switch actuating plate 662 disposed to operate a roller arm 664 of a switch 666, all as shown best in FIGS. 33, 34 and 35 of the drawings. The plate 662, as shown in FIG. 35, is angular in cross section and is provided with slots 665, as shown in FIG. 33. Bolts 668 extend through the slots 665 and provide for vertical adjustability of the switch actuating plate 662 on the shelf-heighth locating carriage 660.

Another switch actuating plate 670 is also slotted in 673, thereby providing for vertical adjustment thereof with respect to the shelf-heighth locating carriage 660. This slotted portion 673 receives the upper one of the bolts 668 and thus permits the switch actuating plate 670 to be vertically adjusted on the carriage 660. This plate 670 is disposed to be engaged by a roller 672 of a switch 674 for actuating this switch 674.

Also supported on the shelf-heighth locating carriage 660 is another switch actuating plate 676 which is engageable by a roller 678 of a switch 680. All of the switches 666, 674 and 680 are mounted on the roller track 172 of the carriage 180, as shown best in FIGS. 33 and 34 of the drawings.

The switch actuating plate 662 is a long plate having considerable vertical length and is engageable by the roller 664 of the switch 666 and this switch 666 is similar in operation to the switch 488, hereinbefore described. This switch 666 controls operation of the motor 152 in order to energize it at slow speed so that vertical movement of the carriage 180 is slowed down as the carriage approaches a level corresponding with one of the shelves of the pallet rack shown in FIGS. 14, 15, and 16. This switch 666 is thus operated in either direction, up or down movement of the carriage 180 as it occurs.

The switch 674 is operated by the roller 672 as the carriage 180 moves vertically when the roller 672 engages the plate 660 at either of its upper or its lower edges 661 or 663. The switch 674 is operable to de-energize the motor 152 and set its brake, as will be hereinafter described, so that as the carriage 180 reaches a predetermined level of one of rack shelves, as shown in FIGS. 14, 15, and 16 of the drawings, the carriage 180 is stopped so that pallets may be delivered to and removed from the shelves, as will be hereinafter described.

The switch 680 is operable by engagement of its roller 678 by the contact plate 676. This contact plate 676 moves downwardly with the carriage 660 and actuates the switch 680 to de-energize the motor 461 so that the carriage 660 will be in position to hold its contact plate 659 in position to be engaged by the roller 672, of the switch 674, so that the motor 152 will be de-energized when the carriage 180 reaches a predetermined level.

The motor 461 is energized by operation of the switch 316 when the lever 310 engages an empty pallet in one of the rack shelves. This causes the motor 461 to power the shelf-heighth locator carriage 660 downwardly until the contact plate 676 operates the roller 678 and actuates the switch 680. Thus, the shelf-heighth locator carriage 660 is moved downwardly on the bar 478 to a position at which the carriage 180 is disposed when the bar 310 actuates the switch 316. Thus, the elevation of the empty pallets removed from the racks are established so that subsequently laden pallets may be placed at this level when the switch 674 is actuated by movement of the carriage 180 to a point where the roller 672 engages one edge of the plate 659, all as shown best in FIGS. 33, 34, and 35 of the drawings.

As shown in FIGS. 26, 31, and 32, the invention comprises means for aligning the pallet handling machine of the invention with a concrete block producing machine and also for aligning and delivering laden pallets from the machine to the pallet handling machine of the invention. As shown diagrammatically in FIG. 26 of the drawings, guides 646 and 648 are disposed to receive pallets 500 therebetween when said pallets are moving in a direction of an arrow in FIG. 26, from the concrete block producing machine 556 toward the pallet handling mahine of the invention. These guides 646 and 648 thus tend to center the pallets with respect to the carriage of the machine of the invention while guides 647 and 649 are disposed to receive the rollers 532 and 534 of the carriage 180 therebetween when the carriage is projected between the guides 647 and 649 thus the carriage is aligned with the oncoming pallets 500 which are guided by the guides 646 and 648.

It will be understood that the operating motor 160 and its brake are electrically released, as hereinbefore described, during the centering operation or the guiding operation wherein the carriage is projected between the guides 647 and 649 in a similar manner to the operation wherein the machine is free to move about a pivotal axis when the rollers 532 and 534 are projected between the shelf members 498, as described in connection with FIGS. 28 and 28A.

While the disclosure of FIG. 26 is diagrammatic, reference is made to FIGS. 31 and 32 showing conveyor mechanism in relation to guides 646, 648, 647, and 649, hereinbefore described. It will be noted that the guides 646 and 648 are flared toward the concrete block producing machine 556 to receive the pallets while the guides 647 and 649 are flared in the opposite direction to receive the rollers 532 and 534 therebetween for aligning the carriage of the pallet handling machine, as hereinbefore described.

As shown in FIGS. 31 and 32, the pallets 500 are moved on a conveyor 682 in the direction of the arrows shown in FIG. 31 and these pallets 500 are powered by rollers 684 toward supporting rollers 686 of a conveyor on which the pallets 500 are delivered. A belt conveyor 688 carries the pallets 500 from the machine 556 and these pallets are initially laden with concrete blocks. As the pallets are powered by the rollers 684 onto the conveyor 686, they pass into position over the guides 647 and 649 whereupon the carriage 180 may be raised by the machine, as hereinbefore described, to pick up the laden pallets and transfer them to shelves in pallet racks, as hereinbefore described.

A limit switch 690 is provided with a roller arm 692 disposed to engage pallets 500 as they move outward on the conveyor 688 from the concrete block producing machine 556. This switch 690 is disposed to stop the production of the concrete block producing machine in the event switches 694 and 696 are also actuated by pallets which fill the conveyor above the guides 647 and 649. It will be appreciated that in the event the offbearing machine of the invention has not removed pallets from the conveyor, that the delivery of additional laden pallets must be stopped and therefore, this switch 690 is operable automatically to stop operation of the concrete block producing machine in this event, as will be hereinafter described.

It will be appreciated that since the switches 690, 694 and 696 are all coupled in such a manner that they must all be actuated concurrently before the switch 690 is effective to stop operation of the machine 556.

The switches 694 and 696 are coupled together in such a manner that they automatically stop operation of a conveyor driving motor 698 when they are both actuated. Thus, when the conveyor is full, above the guides 647 and 649, and the switches 694 and 696 are both actuated, the conveyor drive motor 698 will cease driving the rollers 684. Thus, in accordance with the production rate of the machine 556 and the number of pallets 500 on the conveyor mechanism, between the machine 556 and the pallet handling machine of the invention, the machines are controlled and coordinated in such a manner that the laden pallets will not be pushed off the conveyor but will be retained until they are removed by the pallet handling machine of the invention and further, the concrete block producing machine 556 will automatically be stopped in the event that some condition occurs which prevents the pallet handling machine of the invention from removing the pallets 500 from the conveyor above the guides 647 and 649, at a rate comparable to the production rate of the machine 556.

Operation of the pallet handling machine, in accordance with the present invention, is substantially as follows:

The concrete block producing machine 556, shown in FIGS. 13 and 26 of the drawings, may be a conventional Besser machine or any other similar machine. Such machines deliver several freshly formed concrete blocks on each successively delivered pallet 500, shown best in FIGS. 13, 14, 15, and 16 of the drawings. The level at which the pallets 500, laden with freshly formed blocks, are delivered may be substantially above ground level while various shelves 498, shown in FIGS. 14, 15 and 16, may be above and below the level at which the pallets 500 are delivered from the block machine, as shown in FIGS. 13 and 26. Thus, the machine of the invention must place laden pallets in the rack shelves 498 at various levels above the machine delivery level and at various levels therebelow.

It will be understood that the structure shown in FIG. 26 is a modification of that shown in FIG. 13. However, the structure shown in FIG. 26 is a preferred form of the invention being considerably simplified in structure and operation. Accordingly, the general operation of the machine, as hereinafter described, will relate to the preferred structure.

When the carriage 180 of the machine, shown in FIG. 26, is projected into close proximity to the concrete block producing machine 556, pallets are delivered therefrom between guides 646 and 648 disposed on the machine 556. These guides 646 and 648 align the laden pallets 500 with the bars 296 and 298 of the carriage 180 so that the pallets will subsequently be substantially centered over the bars 296 and 298 and between the arms 506 and 508 so that the pallets subsequently may accurately be placed between the shelf members 498 supported on the uprights 494, all as will be hereinafter described in detail.

When the carriage of the machine is in the position, as shown in FIG. 26, a cycle of operation of the machine is ready to begin and will be hereinafter described in connection with the wiring diagrams, shown in FIGS. 29 and 30.

The capital letter "P," as used as a reference character prefix herein, designates Position relative to various dispositions of the stepper switch mechanism shown in FIGS. 29 and 30, and as will be hereinafter described.

The prefix "LS," as used hereinafter, designates Limit Switch.

The prefix "TD," as used hereinafter, designates Time Delay in relation to relays disclosed in FIGS. 29 and 30.

"CR," used herein, designates Control Relay with relation to various relays shown in FIGS. 29 and 30.

"NC," as used herein as a prefix, designates Normally Closed with relation to various switches disclosed in FIGS. 29 and 30 of the drawings.

A conventional stepping switch comprising various switches, shown in FIGS. 29 and 30, will be hereinafter described in connection with a cycle of electrical and mechanical operation of the invention.

When the machine of the invention is in the position as shown in FIG. 26, at the starting of an operating cycle, reference is made to Position 1 of the stepping switch mechanism, shown in FIGS. 29 and 30, wherein the Time Delay relay 700 is energized by a motor driven cam switch 702 having normally open contacts which causes a magnetic relay 704 to be energized. When TD 700 opens after its predetermined delay, it de-energizes the clutch of the motor 160, and allows the carriage 180 to align between guides 647 and 649, and pallets 500 conveyed from the block machine 556 trip a switch LS 706, shown in FIGS. 10 and 26 of the drawings. This switch LS 706 is provided with a pivoted arm 708 operable by a plunger 710 coupled to a slidably mounted plate 712. This plate 712 is engaged by edges of the pallets 500 and is supported by a shank 714 slidably mounted in a tubular slide bearing 716 carried on the cross member 186 of the carriage 180. A spring 718 is coupled to an end 720 of the member 714 and also to the slide bearing 716 tending to hold the plate 712 in a direction of an arrow 721 so that the plate 712 returns to the solid position, shown in FIG. 10 of the drawings, when not engaged by a pallet 500.

Thus, LS 706 is actuated when laden pallets move outwardly from the block producing machine 556 between the guides 646 and 648 and onto the arms 296 and 298 of the carriage. When LS 706 is thus actuated, it causes the stepping switch, shown in FIGS. 29 and 30, to move to a second position wherein a cam, not shown, closes respective contacts 722, energizing a magnetic relay 724 coupled to the motor 152 tending to operate it in a direction to actuate the chain 146, shaft 134, and the chain 130 to move the carriage 180 upwardly. This action is accomplished at low speed since CR 726 is energized through contacts 728, actuated by the cam, not shown, of the stepper switch in said second position. This condition continues until the carriage moves upwardly to a position wherein the limit switch 452 is actuated by engagement of the plate 440 with the roller contact arm 444, all as shown best in FIG. 1 of the drawings. Thus, the carriage arms 296 and 298 are raised upwardly to clear the delivery level of the conveyor 686 and the concrete block producing machine 556.

Closing of the switch 452 causes the stepping switch to advance to a third position in which a cam, not shown, actuates contacts 730 which energizes a magnetic relay 732 coupled to the motor 210 to energize it in a direction to actuate the shaft 208 and belts 194 in a direction to retract the carriage whereupon LS 734 is tripped by a bracket 188 on the carriage, as shown in FIG. 5 of the drawings. Thus, LS 734 is opened and the magnetic relay 732 is de-energized thereby stopping operation of the motor 210 when the carriage is completely retracted.

The stepper switch also, when in said third position, causes a cam, not shown, to close contacts 736 and energize either a magnetic relay 738 or a magnetic relay 740 which are coupled to the motor 160 for energizing it to swing the carriage about a vertical axis either in a clockwise or counter-clockwise direction, depending upon a position of contacts in CR 742, as will be hereinafter described in detail. While the carriage is rotating on a vertical axis, it is also moving up or down, depending upon the position of a limit switch 430, shown in FIGS. 24 and 29 of the drawings. This switch is provided with a pair of switch contact portions 744 and 746 operable alternately by the double roller contact arm 426, shown in FIG. 24 of the drawings. Thus, this switch determines which direction the carriage will move, either up or down, when moving from the concrete block producing machine to the shelves 498 of the pallet racks, hereinbefore described.

It will be seen that the arm 492, as shown in FIG. 24 of the drawings, when it moves to a position above the switch 430, causes the arm 426 to move upwardly and consequently actuate one pair of the switches 744 or 746. Thus, when the carriage of the machine is loading and unloading pallet rack shelves at a position above the delivery level of the concrete block machine, the switch 430 is actuated in such a manner that it will cause energization of the magnetic relay 724 and cause upward movement of the machine carriage from a level of the concrete block machine to a higher level at which pallet rack shelves are being loaded and unloaded.

When the stepping switch is in position 3 and the switch 430 is in a position to energize the magnetic relay 722, the carriage moves up as it swings around its vertical axis, or in another position of the switch 430, the carriage may move down as it is rotated about a vertical axis and in this instance, the magnetic relay 748 is energized which energizes the motor 152 in a direction to power the carriage downwardly as it swings about its vertical axis.

As the carriage is thus moved vertically, limit switch 490 is actuated by contact of its arm 488 by the plate 486 of the shelf-heighth locator 480.

As will be hereinafter described, the shelf-heighth locator 480 is automatically positioned vertically with respect to a shelf 498, as hereinbefore described, by means of the lever 310 which engages an unladen pallet on one of the shelves and actuates a limit switch 316, shown in FIG. 9 of the drawings. Thus, the shelf-heighth locator is initially disposed vertically on the bar 478 so that when the carriage 180 and its roller track 172 moves vertically, the plate 476 is held in position for contact of the arm 488 of the switch 490 in order to stop the carriage 180 by de-energization of the motor 152 and energization of its electric brake 154.

It will be understood that this motor 152 is a right angle gear drive motor which is provided with gears which also tend to hold its output shaft in a fixed position when the motor is stopped.

As the carriage 180 is rotated about the vertical axis of the column 58, LS 750, shown in FIG. 26 of the drawings, is tripped by contact with an upstanding member 173 on the base of the machine whereupon the respective magnetic relay 738 or 740 is de-energized causing the machine to rotate on a vertical axis to a stop by energization of the brake 162 on the motor 160. Actuation of LS 750, as shown in FIG. 26 of the drawings, also energizes the stepper switch to move to a fourth position wherein a cam, not shown, actuates a switch 752 which energizes TD 701 which, after a slight time delay, causes energization of the magnetic relay 704 to move the carriage 180 outward.

During the time delay provided by TD 701 and when the normally closed contacts thereof open the magnetic clutch 164 on the motor 160 is automatically de-energized allowing the carriage to rotate freely about the vertical axis of the column 58. Thus, as the carriage moves outwardly between the uprights 494 of the pallet rack, as shown in FIG. 26, and as hereinbefore described, the arms 506 and 508 engage between the edges of the shelf members 498 and automatically align the carriage with the rack shelves so that the laden pallets 500 may be accurately located above the shelf angles 498 as the carriage arm members 296 and 298 are projected between the uprights 494 and between the shelf members 498.

As the carriage moves outwardly into the position shown in FIG. 15 of the drawings, by broken lines, LS 754 is actuated by movement of the plate 188, shown in FIG. 5, which energizes the stepping switch to a fifth position wherein a cam, not shown, closes contacts 756 which energizes the magnetic relay 748, thereby causing operation of the motor 152, at low speed, in a direction to lower the carriage 180, at low speed, so that the laden pallets 500 are gently deposited upon the shelf angle members 498 of the respective pallet rack.

As the carriage moves downward from a position, as shown in FIG. 15, to a position shown in FIG. 16, the lever 308 at its portions 310 engages the upper surface of one of the unladen pallets 500, as shown in FIG. 9 of the drawings, thereby actuating the limit switch 316, as hereinbefore described.

When this limit switch 316 is actuated, it causes de-energization of the magnetic relay 748 in a direction to stop operation of the motor 152 and cause the magnetic brake 154, thereof, to be set and energization of this limit switch 316 also causes the stepping switch to move to a sixth position. Actuation of the switch 316 also causes relocation of any one of the shelf-heighth locator carriages 372, 480, or 660 in order to establish an elevation at which the carriage 180 will subsequently return to deposit laden pallets, as hereinbefore described. A cam, not shown, of the stepper switch is thus automatically closed causing the switch to pass the 6th, 7th, 8th, and 9th positions unless LS 456, as shown in FIG. 21, is actuated, as will be hereinafter described.

When LS 316 is thus actuated, it also energizes the motor 461, shown in FIG. 24 of the drawings, causing it to drive the chain 468 and to move the shelf-heighth locator 480, or modifications 372 or 660 thereof, downward on the bar 478 until LS 495 is actuated, which de-energizes operation of the motor 461 and sets the brake thereof.

It will be understood that this motor is a right angle gear drive motor and that the output shaft 462 will be held in position by the right angle gear mechanism after the motor is stopped. Thus, the shelf-heighth locator 480 is driven downwardly by the motor 461 until the plate 486 trips the limit switch 495 which thus stops downward movement of the shelf-heighth locator 480 in a position corresponding to the empty pallets engaged by the arm 310, as shown in FIGS. 9 and 15 of the drawings. Thus, a position is established at which the machine may return to place laden pallets on the shelves of the rack previously occupied by the empty pallets. Thus, the shelf-heighth locator 480 will remain in its locket position until the switch 316 is again tripped by engagement of the arm 308 with empty pallets on the next lower one of the rack shelves 498. When the lowermost rack shelf 498 has been loaded and the carriage moves downward therebelow, the limit switch 456 is actuated to energize CR 758 which prevents the stepper switch from bypassing positions 6, 7, 8, and 9 and whereby the stepper switch will, as hereinbefore described, move said to said sixth position. At said sixth position a cam, not shown, closes contacts 730 to energize the magnetic relay 732 which, as hereinbefore described, retracts the carriage 180 which is limited by actuation of LS 734 and the brake, in connection with the motor 210, as applied and further LS 734 causes the stepper switch to move to a seventh position. In the seventh position, a cam, not shown, of the stepper switch closes contacts 722 which energizes the magnetic relay 724 and energizes the motor 152, in connection therewith. Thus, the carriage 180 is moved up and this motor 152 is de-energized by actuation of the limit switch 450.

At the same time as the carriage 180 is moved upwardly by operation of CR 758 through LS 456, CR 760 is energized through contacts 762 coupled to LS 456, thus, the motor 461 is energized in a direction to move the shelf-heighth locator carriage 480 upwardly on the bar 478 until LS 764 is operated by the plate 486 which de-energizes CR 760. The shelf-heighth locator mechanism is then in its uppermost position and ready to be moved downwardly progressively in correspondence with actuation of LS 316 as each of the empty pallets are contacted by the arm 308, as hereinbefore described.

The limit switch 450, control relay 758, and LS 750, all being actuated, cause the stepper switch to move to an eighth position. Actuation of the stepper switch to said eighth position causes closing of the switch by a cam which energizes the time delay relay 700 causing ultimate energization of the relay 704 which energizes the motor 210 in a direction to move the carriage outwardly until LS 754 de-energizes the relay 704, at which time, the carriage 180 is in a position above that shown in FIG. 14 of the drawings, wherein the hook 300 or the ends 544 of the pins 514 are in a position above and beyond the edges of the pallets 500 to permit retraction thereof onto the bars 282 and 284, as will be hereinafter described. It will be understood that the hook 300 or pins 544 are placed in a position beyond the edges of the pallets 500. By operation of the stepper switch to a position 9, a cam, not shown, closes contacts 756 and causes energization of the magnetic relay 748 at slow speed thereby moving the carriage down slowly by energization of the motor 152. Thus, the carriage moves down slowly until the arm 308, as shown in FIG. 9, operates the limit switch 316 which energizes the stepping switch to a tenth position. Energization of the limit switch 316 also energizes the motor 461 to move the shelf-heighth locating carriage 480 downwardly to a position at which LS 495 or LS 676 is actuated by contact of this switch with the plate 486 or respective plate 659 while the switch 495 is supported on the carriage frame 172. Thus, the motor 461 is de-energized and the shelf-heighth locating carriage 480 or carriage 660 is then again fixed in position corresponding to the locations of the unladen pallets, as indicated in FIG. 14.

As the stepping switch is moved to said tenth position, a cam closes its respective switch 730 and energizes the magnetic relay 732 which causes the motor 210 to retract the carriage and thereby rake the empty pallets onto the bars 282 and 284. The control 759 also energizes the magnetic relay 732 while the stepping switch moves through positions 6, 7, 8, and 9, as hereinbefore described, in order to operate the machine at optimum speed in this function.

Limit switch 734, being closed, advances the stepper switch through an eleventh position to a twelfth position. When the stepping switch is moved to said twelfth position, a cam closes contacts 766 causing either the magnetic relay 738 or the magnetic relay 740 to be energized depending upon the position of the relay 742 to thereby return the carriage of the machine toward the delivery position of the stationary concrete block machine 556. LS 768 is then actuated to de-energize either the magnetic relay 738 or 740 and thus, the motor 160 is de-energized and the carriage stops swinging about its vertical axis at a position substantially in alignment with the concrete block producing machine 556. In said twelfth position of the stepper switch, a cam, not shown, closes contacts 756 and energizes the relay 748 until LS 454 de-energizes the motor 152 causing the carriage 180 to be moved to a position corresponding with the level of the concrete block producing machine 556.

It will be understood that when the carriage 180 is loading and unloading shelves below the delivery level of the machine 556, that the limit switch 432 determines which of the magnetic relays 724 or 748 will be energized so that in the event the carriage is operating below the level of the concrete block producing machine, that the magnetic relay 724 will be energized to cause movement of the carriage upwardly as the carriage returns to the position shown in FIGS. 13 and 26, at the delivery level of the machine. Conversely, when the carriage 180 is loading and unloading shelves above the delivery level of the producing machine 556, that the limit switch 430 determines which of the relays 724 or 748 will be energized so that in the event the carriage 180 is operating above the level of the producing machine, the magnetic relay 748 will be energized to cause movement of the carriage 180 downwardly as the carriage moves to the delivery level of the producing machine, as shown in FIGS. 13 and 26.

As the carriage 180 returns to the position shown in FIGS. 13 and 26, limit switches 454 and 768, having normally open contacts, are closed causing the stepper switch to move to position 1 to start a new cycle.

It will be understood that when the machine of the invention has filled the lowermost shelves 498 in any particular bay of the pallet racks, that LS 456 will be actuated, as hereinbefore described, moving the stepper switch to the sixth position followed by the sequence hereinbefore described, whereupon the motor 594 or a corresponding motor on a pallet rack carriage at the opposite side of the machine, may be energized through respective relays 770 or 772, depending upon the side of the machine at which the carriage is being actuated. This being indicated by arrows F and G, in FIG. 13 of the drawings. Thus, when the limit switch 456 is actuated, one of the rack carriages is moved into a position in a direction as indicated by the arrow 614 in FIG. 13 of the drawings, so that the next bay of rack shelves are in position to align with the broken line position of the carriage, as shown in FIG. 13 of the drawings. This position also being shown in FIG. 26 of the drawings.

With each operation of the limit switch 456, the motor 461 is energized to actuate the chain 468 and move the shelf-heighth locator 480 upwardly until the plate 486 actuates LS 764 and thereby de-energizes the motor 461.

As shown in FIGS. 17, 18, and 20, the limit switch 624 is actuated by any one of the clips 636 to locate a corresponding bay of rack shelves and thus, operation of the motor 594 is stopped as each rack of shelves passes into alignment with the broken line position of the carriage, as shown in FIG. 26 of the drawings.

The actuating arms 628 and 632 of the respective limit switches 622 and 626 cooperate with the actuating plates 642 and 644, respectively, on the pallet rack carriage in order to control operation of the motor 594 through the relays 720 and 722, to move the carriage longitudinally of the respective tracks 584 and to energize the offbearing machine of the invention to return to the opposite side of the concrete block producing machine 556 when all of the bays of the pallet rack carriages, at opposite sides F and G of the machine, as shown in FIG. 13 of the drawings.

It will be appreciated by those skilled in the art that the modified shelf-heighth locator 372, as shown in FIGS. 22 and 23 of the drawings, employs a latch bar 386 which stops on fixed stops 390 on the bar 370.

A solenoid 406 is actuated by operation of the limit switch 316 when the arm 308 contacts empty pallets 500. Thus, the solenoid 406 releases the latch bar 388 from the respective stop 390 permitting the shelf-heighth locator 372 to drop on the bar 370 until the latch 388 engages the next successively lower stop 390. Thus, the shelf-heighth locator 372 is positioned at a location corresponding with empty pallets removed from rack shelves so that laden pallets may subsequently be placed in a corresponding position. This is accomplished by the position of the plate 400 carried by the shelf-height locator 372 and engaged by the switch 404 when the carriage frame 172 moves down to a position corresponding with the previously engaged empty pallets which cause tripping of the switch 316.

In accordance with the disclosures of FIGS. 5, 6, 11, and 12, the arms 360 and 324 are utilized to contact the upright members 494 of the pallet racks as the carriage of the machine is swung about a vertical axis during operation of the motor 160 which swings the machine about said vertical axis.

The solenoids 334 may be energized to release the arms 320 and project the switch arms 360 and 324, as hereinbefore described, in the direction of the arrow B, as shown in FIG. 11.

Energization of one of the solenoids 334 with respect to the direction of the swinging movement of the carriage 180 may project the arm 360, for example, as shown in FIG. 12 of the drawings. Energization of either of the solenoids 334 may be accomplished by operation of a cam of the stepper switch in position 4, determined by CR 742, preliminary to the movement of the carriage 180 into the broken line position, as shown in FIG. 26 of the drawings. Thus, the respective arm 360 or 324, engaging one of the uprights 494 or one of the shelf members 496, will cause operation of the respective switch 358 or 322 and thereby de-energize the motor 160 and set the brake thereof to hold the carriage in alignment with the broken line position, shown in FIGS. 13 or 26. Thus, the carriage may subsequently be projected into the shelf positions of the pallet racks between the shelf members 498, as hereinbefore described.

Functions of the relays, as shown in FIGS. 29 and 30, are as follows:

CR 758 permits the carriage of the machine to be actuated about a vertical axis by operation of the motor 160 in one direction or the other, as indicated by arrows F and G, in FIG. 13 of the drawings.

CR 762 permits the stepping switch of the invention to operate through steps 6, 7, 8, and 9 to energize various elements of the invention, as hereinbefore described, so that the machine may pick up pallets from the top of the rack, as indicated in FIG. 14 of the drawings, and also prevents the carriage from rotating about a vertical axis, thus maintaining the motor 160 de-energized when the carriage is moved from a lowermost position following actuation of the limit switch 18 until the carriage arrives at an uppermost position, as shown in FIG. 14 of the drawings.

CR 742 predetermines the rotational direction of the carriage about a vertical axis as it pivots from the concrete block machine and returns thereto. This control relay 792 also energizes relay 774.

CR 774 predetermines the direction that the pallet rack carriage is moved, as for example, arrow 614 indicates one direction of movement while the carriage may move in the opposite direction, as hereinbefore described.

CR 776 allows the carriage to retract toward the column 58 by energization of the motor 210 while the stepping switch moves through positions 6, 7, 8, and 9, hereinbefore described.

CR 778 serves as an emergency safety stop switch.

CR 780 prevents feed back when LS 622 or LS 625 energizes CR 742.

CR 782 overrides LS 624 or LS 790 to allow a respective pallet rack carriage to move forward with reference to one of the tabs 636 and the switch 624 so that individual bays of pallet supporting shelves may be progressively moved into position to align with the broken line position of the carriage, as shown in FIG. 26.

CR 784 prevents the stepping switch from stepping through position 10, as hereinbefore described.

CR 786 predetermines slow or fast operation of the motor 152 when moving the carriage frame 78 upwardly or downwardly.

As shown in FIGS. 29 and 30, functions of the time delay relays are as follows:

TD 701 delays outward movement of the pallet handling carirage by the motor 210 until it has time to align with the rack or block machine, as indicated by broken lines in FIG. 26 of the drawings. TD 701 also de-energizes the magnetic clutch or brake 162 on the motor 160 so that the carriage at its arms 506 and 508 may wedge between shelf members of the rack and freely pivot the carriage into alignment with the rack or block machine, as hereinbefore described.

TD 700 acts as a safety switch to de-energize CR 778 if the stepping switch does not advance within a predetermined time and thus, all motions of the machine of the invention are automatically stopped.

TD 788 permits CR 782 to energize only a sufficient time to bypass LS 624 and LS 790, so LS 624 and LS 790 may stop a respective pallet rack carriage by de-energizing the respective motor 594 thereof in order to dispose a bay of rack shelves containing unladen pallets in a position to align with the broken line position of the pallet carriage, as shown in FIG. 26 of the drawings.

As shown in FIGS. 29 and 30 of the drawings, the limit switches of the invention function as follows:

LS 706 energizes the stepping switch from a first position to a second position.

LS 452 energizes the stepping switch from a second position to a third position.

LS 768 energizes the stepping switch to fourth and eighth positions and also stops rotation of the carriage about a vertical axis of rotation by de-energizing the operation of the motor 160.

LS 754 energizes the stepping switch to fifth and ninth positions and stops operation of the motor 210 in its function of moving the carriage outwardly.

LS 316 energizes the stepping switch to sixth and tenth positions and stops operation of the motor 152 in a direction moving the carriage downwardly. Also LS 316 initiates operation of the shelf-heighth locating mechanism of the invention.

LS 734 energizes the stepping switch to seventh, eleventh, and twelfth positions and stops operation of motor 210 moving carriage inwardly.

LS 450 serves as an upper limit switch and energizes the stepping switch from seventh to eighth position.

LS 768 energizes the stepping switch to a first position and stops rotation of the carriage about a vertical axis upon its return to alignment with the concrete block producing machine 556.

LS 454 energizes the stepping switch to a first position and de-energizes operation of the motor 152 in either direction, up or down, returning to the block machine 556 in accordance with positions of the switches 430 or 432 which are double contact switches, hereinbefore described and shown in FIG. 24 of the drawings.

LS 764 stops upward movement of the shelf-heighth locator 480 by de-energizing operation of the motor 461, as shown in FIG. 24 of the drawings.

LS 491 or LS 666 activates a relay tending to energize the motor 152 at low speed when moving the carriage 180 up or down.

LS 495 or LS 680 provides a stop switch for downward movement of the shelf-heighth locator by de-energizing the motor 461 as it powers the shelf-heighth locator downwardly.

LS 792 prevents the carriage 180 from being moved downwardly until it has been rotated about a vertical axis and clear of the concrete block producing machine 556.

LS 456 energizes CR 762 and allows movement of the carriage from a lowermost shelf position to an uppermost shelf position to pick pallets off the top of a bay of rack shelves.

LS 622 energizes CR 770 and stops operation of the motor 594 of the pallet rack carriage on the right hand side of the machine of the invention.

LS 624 functions to limit operation of the motor 594 on the pallet rack carriage at the right hand side of the machine of the invention for bringing bays of rack shelves into register with the position of the carriage, as indicated by broken lines in FIG. 26 of the drawings.

LS 625 energizes magnetic relay 794 and acts to de-energize operation of the motor 594 of the pallet rack carriage on the left side of the machine of the invention whereby said carriage may be moved forwardly in a direction of the arrow 614 and into a location so that a bay of rack shelves will register with the broken line position of the machine carriage, as shown in FIG. 26 of the drawings.

LS 626 energizes a relay 772 and thereby de-energizes operation of the motor 594 of a pallet rack carriage on the right hand side of the machine of the invention when said carriage is moving in the reverse direction relative to the arrow 614, shown in FIG. 13 of the drawings.

LS 627 is disposed to operate a relay 796 and to energize operation of the motor 594 of a pallet rack carriage on the left side of the machine of the invention when it is moving in a reverse direction relative to the arrow 614, in FIG. 13 of the drawings.

LS 790 acts to position a pallet rack carriage and limit operation of the motor 594 when bays of rack shelves are disposed to register with the broken line position of the carriage, as shown in FIG. 26 of the drawings.

It will be obvious to those skilled in the art that various modifications of the present invention may be resorted to in a manner limited only by a just interpretation of the following claims:

We claim:

1. In a pallet handling machine for transferring laden pallets from a concrete block producing machine to racks and for transferring unladen pallets from said racks to the concrete block producing machine the combination of: a pallet handling carriage movable horizontally; a frame having first means telescopically supporting said carriage for horizontal movement thereon; a member having second means for supporting said frame for vertical movement thereon; third means pivotally supporting said member about a substantially vertical stationary axis; a pallet supporting rack; horizontally spaced members of said rack; vertically spaced shelf members of said racks disposed to support opposite edges of block supporting pallets; and outwardly converging means on said carriage disposed wedgably to slide between said horizontally spaced members and thereby guide said carriage and laden pallets carried thereby into a position wherein said pallets are deposited on said shelf members of said carriage; fourth means comprising an electric motor for driving and stopping said third means and thereby pivoting said third means and said carriage toward an aligning position relative to said horizontally spaced members; first switch means operable in response to pivotal movement of said third means about said vertical axis, said first switch means coupled to said electric motor and disposed to be actuated and to de-energize said electric motor when said carriage approaches alignment with said horizontally spaced members; and second switch means disposed to be actuated in response to outward movement of said carriage, an electrically operable release means disposed to release said carriage for free pivotal movement about said vertical axis, said second switch means coupled to said release means and when actuated by said outward movement of said carriage disposed to operate said release means to thereby permit free pivotal movement of said carriage about said vertical axis so that it may, at its converging means, align with said shelf members as said carriage is wedgably projected horizontally between said horizontally spaced members.

2. In a pallet handling machine the combination of: a pallet handling carriage; means for supporting it comprising means movable vertically and horizontally; pallet centering means on said carriage comprising members engageable with opposite edges of a pallet on said carriage; means for moving said members toward a center position for forcing pallets into a corresponding center position relative to said carriage; and rack engaging means on said carriage comprising a member having centering means disposed to engage a member of a pallet rack for aligning said carriage laterally relative to the shelves in said rack whereby the pallets previously centered on said carriage are precisely aligned laterally with shelves in the racks; and cam means operable by movement of said carriage horizontally to actuate said members to center pallets on said carriage.

3. In a pallet handling machine the combination of: a pallet handling carriage; means for supporting it comprising means movable vertically and horizontally; frame means pivotally supporting said carriage for pivotal movement about a vertical axis; an electric motor and brake means operable for pivoting said carriage about said vertical axis and for stopping said pivotal movement about said vertical axis; an extendable member disposed at an outer end of said carriage; an electrical switch means in circuit with said motor and said brake, said switch means carried by said extendable member and disposed to be actuated by engagement with a member of a pallet supporting rack, whereby said switch means when so actuated de-energizes said motor and energizes said brake to stop said carriage in alignment with shelves of a pallet rack.

4. In a pallet handling machine for transferring laden pallets from a concrete block producing machine to racks and for transferring unladen pallets from the racks to the concrete block producing machine the combination of: a pallet handling carriage movable horizontally; a frame having first means telescopically supporting said carriage for horizontal movement thereon; a member having second means for supporting said frame for vertical movement thereon; and third means pivotally supporting said member about a substantially vertical stationary axis; an electric motor and brake means for pivoting said third means and said carriage laterally about said vertical axis and for stopping such pivotal action; an extendable switch means on said carriage and disposed to engage a member of a pallet rack; said switch means when actuated by lateral swinging movement of said carriage about said vertical axis disposed to cause de-energization of said motor and energization of said brake to stop said lateral swinging movement of said carriage so that it aligns laterally with shelves of said racks.

5. In a pallet handling machine for transferring laden pallets from a concrete block producing machine to racks and for transferring unladen pallets from said racks to the concrete block producing machine the combination of: a pallet handling carriage movable horizontally; a frame having first means telescopically supporting said carriage for horizontal movement thereon; a member having second means for supporting said frame for vertical movement thereon; third means pivotally supporting said member about a substantially vertical stationary axis; horizontally spaced members of said racks; shelf means between said spaced members and outwardly converging means of said carriage disposed wedgably to slide between said horizontally spaced members and thereby guide said carriage and laden pallets carried thereby into a position wherein said pallets are aligned between said horizontally spaced members by said carriage; and second horizontally spaced members adjacent said machine, said converging means engageable between said second horizontally spaced members to align said carriage with said concrete block producing machine to pick up laden pallets in correct centered relation to said carriage.

6. In a pallet handling machine the combination of: a pallet handling carriage movable horizontally; a frame having first means telescopically supporting said carriage for horizontal movement thereon; a member having second means for supporting said frame for vertical movement thereon; third means pivotally supporting said member about a substantially vertical stationary axis; a pallet rack; vertically disposed means of said rack; vertically spaced shelf members of said rack; and outwardly movable means of said carriage disposed to engage said vertically disposed means to guide said carriage and laden pallets carried thereby into a position wherein said pallets are deposited on said shelf members by said carriage; fourth means for driving and stopping said third means and thereby pivoting said third means and said carriage toward an aligning position relative to said shelf members; first switch means operable in response to pivotal movement of said third means about said vertical axis, said first switch means coupled to said fourth means and disposed to be actuated and to stop said third means when said carriage approaches alignment with said vertically disposed means electrically operable release means disposed to provide for free pivotal movement of said third means about said vertical axis; and second switch means in circuit with said fourth means subsequently to release it, said second switch means when actuated thus permitting free pivotal movement of said carriage about said vertical axis so that said outwardly movable means may engage said vertically disposed means and align with said shelf members as said carriage is projected horizontally against said vertically disposed means.

7. In a pallet handling machine the combination of: a pallet handling carriage movable horizontally; a frame having first means telescopically supporting said carriage for horizontal movement thereon; a member having second means for supporting said frame for vertical movement thereon; third means pivotally supporting said member about a substantially vertical stationary axis; pallet racks adjacent said frame horizontally spaced means of said racks; and outwardly converging means of said carriage disposed wedgably to engage between said spaced means and thereby guide said carriage and laden pallets carried thereby into a position wherein said pallets are deposited on said spaced means by said carriage; fourth means including driving stopping and releasing means for driving, stopping and releasing said third means, said fourth means disposed to pivoting said third means and said carriage toward an aligning position relative to said horizontally spaced means; first switch means operable in response to pivotal movement of said third means about said vertical axis; said first switch means coupled to said fourth means and disposed to be actuated and to stop said third means when said carriage approaches alignment with said horizontally spaced means; and second switch means in circuit with said releasing means of said fourth means subsequently to release it; said second switch means when actuated thus permitting free pivotal movement of said carriage about said vertical axis so that said carriage may, at its converging means, align with said horizontally spaced means as said carriage is wedgably projected horizontally between said horizontally spaced means.

8. In a pallet handling machine the combination of: a pallet handling carriage movable horizontally; a frame having first means telescopically supporting said carriage for horizontal movement thereon; a member having second means for supporting said frame for vertical movement thereon; stationary means pivotally supporting said member about a substantially vertical stationary axis; pallet racks adjacent said frame; horizontally spaced members of said racks; and outwardly converging means of said carriage disposed wedgably to slide between said spaced members and thereby guide said carriage and laden pallets carried thereby into a position wherein said pallets are deposited on said shelf members by said carriage; said outwardly converging means of said carriage comprising wedging members pivoted to said carriage at its outer end and opposite sides, said wedging members having free ends extending away from said outer end and in diverging relation to each other and from their pivotal connections with said carriage; resilient means tending to pivot said wedge members into said diverging relation and to pivot their said free ends away from said carriage.

9. In a pallet handling machine the combination of: a pallet handling carriage movable horizontally; a frame having first means telescopically supporting said carriage for horizontal movement thereon; a member having second means for supporting said frame for vertical movement thereon; third means pivotally supporting said member about a substantially vertical stationary axis; pallet racks adjacent said frame; horizontally spaced members of said racks; and outwardly converging means of said carriage disposed wedgably to slide between said spaced members and thereby guide said carriage and laden pallets carried thereby into a position wherein said pallets are deposited on said spaced members by said carriage; fourth means for driving and stopping said third means and thereby pivoting said third means and said carriage toward an aligning position relative to said spaced members; first switch means operable in response to pivotal movement of said third means about said vertical axis, said first switch means coupled to said fourth means and disposed to be actuated and to stop said third means when said carriage approaches alignment with said spaced members; and second switch means in circuit with said fourth means subsequently to release it, said second switch means, when actuated, thus permitting free pivotal movement of said carriage about said vertical axis so that said carriage may, at its converging means, align with said spaced members as said carriage is wedgably projected horizontally between said spaced members; said outwardly converging means of said carriage comprising wedging members pivoted to said carriage at its outer end and opposite sides, said members having free ends extending away from said outer end and in diverging relation to each other and from their pivotal connections with said carriage; resilient means tending to pivot said wedge members into said diverging relation and to pivot their said free ends away from said carriage.

10. In a pallet handling machine for transferring laden pallets from a concrete block producing machine to racks and for transferring unladen pallets from said racks to the concrete block producing machine, the combination of: a pallet carriage movable horizontally; a frame having first means telescopically supporting said carriage for horizontal movement thereon; a member having second means for supporting said frame for vertical movement thereon; stationary means pivotally supporting said member about a substantially vertical stationary axis; horizontally spaced members of said racks; vertically spaced shelf means of said racks; and outwardly converging means of said carriage disposed wedgably to slide between said horizontally spaced members and thereby guide said carriage and laden pallets carried thereby into a position wherein said pallets are deposited on said shelf means by said carriage; a conveyor means disposed to transfer laden pallets from a concrete block producing machine to said pallet handling machine; first spaced guide means adjacent said conveyor and disposed to receive said outwardly converging means therebetween; and second spaced guide means in parallel alignment with said first guide means; said second spaced guide means disposed to engage opposite edges of laden pallets on said conveyor to thereby align them centrally with respect to said carriage when disposed between said first guide means.

References Cited by the Examiner
UNITED STATES PATENTS

| | | | |
|---|---|---|---|
| 671,588 | 4/1901 | Gauhe | 212—64 |
| 860,149 | 7/1907 | Platt | 214—16.4 X |
| 874,553 | 12/1907 | Williams | 212—64 |
| 1,430,766 | 10/1922 | Stebler | 198—37 |
| 1,566,488 | 12/1925 | Lewis et al. | |
| 1,675,722 | 7/1928 | Moores | 214—38 X |
| 2,019,949 | 11/1935 | Brace | 214—38 X |
| 2,386,520 | 10/1945 | Watson et al. | 214—11 X |
| 2,651,087 | 9/1953 | Fellows | 214—59 X |
| 2,692,418 | 10/1954 | Besser | 214—16.4 X |
| 2,803,356 | 8/1957 | Thomas | 214—16.4 |
| 2,808,157 | 10/1957 | Terrill | 214—38 |
| 3,000,520 | 9/1961 | Thomas et al. | 214—16.4 |
| 3,011,661 | 12/1961 | Thomas et al. | 214—16.4 |
| 3,028,947 | 4/1962 | Robertson | 198—37 |
| 3,033,391 | 5/1962 | Schubert | 214—16.4 |
| 3,043,452 | 7/1962 | Spillios | 214—16.4 |
| 3,049,247 | 8/1962 | Lemelson | 214—16.4 |
| 3,055,514 | 9/1962 | Dale et al. | |
| 3,115,974 | 12/1963 | Kovach | 214—16.4 |

GERALD M. FORLENZA, *Primary Examiner.*

HUGO O. SCHULZ, *Examiner.*